(12) United States Patent
Ko

(10) Patent No.: US 10,175,658 B2
(45) Date of Patent: Jan. 8, 2019

(54) SYSTEMS AND METHODS FOR SENSOR PLATFORM

(71) Applicant: GM GLOBAL TECHNOLOGY OPERATIONS LLC, Detroit, MI (US)

(72) Inventor: Yung-Chang Ko, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 269 days.

(21) Appl. No.: 15/197,662

(22) Filed: Jun. 29, 2016

(65) Prior Publication Data

US 2018/0004170 A1 Jan. 4, 2018

(51) Int. Cl.
| | |
|---|---|
| *G05B 11/01* | (2006.01) |
| *H02P 6/04* | (2016.01) |
| *H02K 11/21* | (2016.01) |
| *B60R 11/02* | (2006.01) |
| *G05B 15/02* | (2006.01) |
| *B60R 11/04* | (2006.01) |
| *G05D 3/00* | (2006.01) |
| *B60R 11/00* | (2006.01) |
| *G05D 1/00* | (2006.01) |
| *G05D 1/02* | (2006.01) |

(52) U.S. Cl.
CPC .............. *G05B 11/01* (2013.01); *B60R 11/02* (2013.01); *B60R 11/0258* (2013.01); *B60R 11/04* (2013.01); *G05B 15/02* (2013.01); *G05D 3/00* (2013.01); *H02K 11/21* (2016.01); *H02P 6/04* (2013.01); *B60R 2011/004* (2013.01); *B60R 2011/0085* (2013.01); *G05D 1/0088* (2013.01); *G05D 1/0276* (2013.01)

(58) Field of Classification Search
CPC ...................................................... G05B 11/01
USPC ........................................................ 318/3, 34
See application file for complete search history.

(56) References Cited

U.S. PATENT DOCUMENTS

| | | | |
|---|---|---|---|
| 4,690,012 A | 9/1987 | Dahlquist | |
| 4,990,050 A | 2/1991 | Tsuge | |
| 4,997,413 A | 3/1991 | Dahlquist | |
| 5,507,818 A | 4/1996 | McLaughlin | |
| 5,566,447 A * | 10/1996 | Sakurai | H05K 13/08 29/709 |
| 5,761,965 A | 6/1998 | Dahlquist | |

(Continued)

OTHER PUBLICATIONS

Ko, Yung-Chang, U.S. Appl. No. 15/197,654 entitled, "Systems and Methods for Sensor Platform," filed Jun. 29, 2016.

(Continued)

*Primary Examiner* — David S Luo
(74) *Attorney, Agent, or Firm* — Lorenz & Kopf, LLP

(57) ABSTRACT

Methods and apparatus are provided for controlling a movement of a sensor platform. The method includes receiving a desired position of the platform from a source. The desired position includes a first coordinate value and a second coordinate value. The method includes, based on the first coordinate value and the second coordinate value, calculating, by a processor, a first value associated with a first axis of rotation of the platform and calculating a second value associated with a second axis of rotation of the platform. The method includes outputting, by the processor, one or more control signals to at least one motor associated with the platform to move the platform based on the first value and the second value.

19 Claims, 14 Drawing Sheets

(56) References Cited

U.S. PATENT DOCUMENTS

| | | | |
|---|---|---|---|
| 5,860,327 | A | 1/1999 | Stanev |
| 5,887,800 | A | 3/1999 | McCiosky |
| 6,976,401 | B2 | 12/2005 | Okamoto |
| 7,036,215 | B2 * | 5/2006 | Kodama ............ H05K 13/0069 29/740 |
| 7,512,452 | B2 * | 3/2009 | Mauro .................. G01D 5/347 700/60 |
| 8,935,057 | B2 | 1/2015 | Dolinar |
| 9,272,414 | B2 | 3/2016 | Long |
| 9,744,912 | B1 | 8/2017 | Nobert |
| 10,059,010 | B2 | 8/2018 | Bakir |
| 2004/0149064 | A1 | 8/2004 | Narita |
| 2004/0218042 | A1 | 11/2004 | Kanada |
| 2005/0205789 | A1 | 9/2005 | Caron |
| 2006/0179964 | A1 | 8/2006 | Hama |
| 2015/0047452 | A1 | 2/2015 | Wolf |
| 2017/0175948 | A1 | 6/2017 | Zeise |
| 2017/0198747 | A1 | 7/2017 | Chen |
| 2018/0002036 | A1 | 1/2018 | Tian |
| 2018/0015886 | A1 | 1/2018 | Frank |
| 2018/0037172 | A1 | 2/2018 | Nelson |

OTHER PUBLICATIONS

U.S. Appl. No. 15/197,654; Non-final Office Action—dated Apr. 19, 2018.
USPTO, Final Office Action for U.S. Appl. No. 15/197,654 dated Sep. 27, 2018.

* cited by examiner

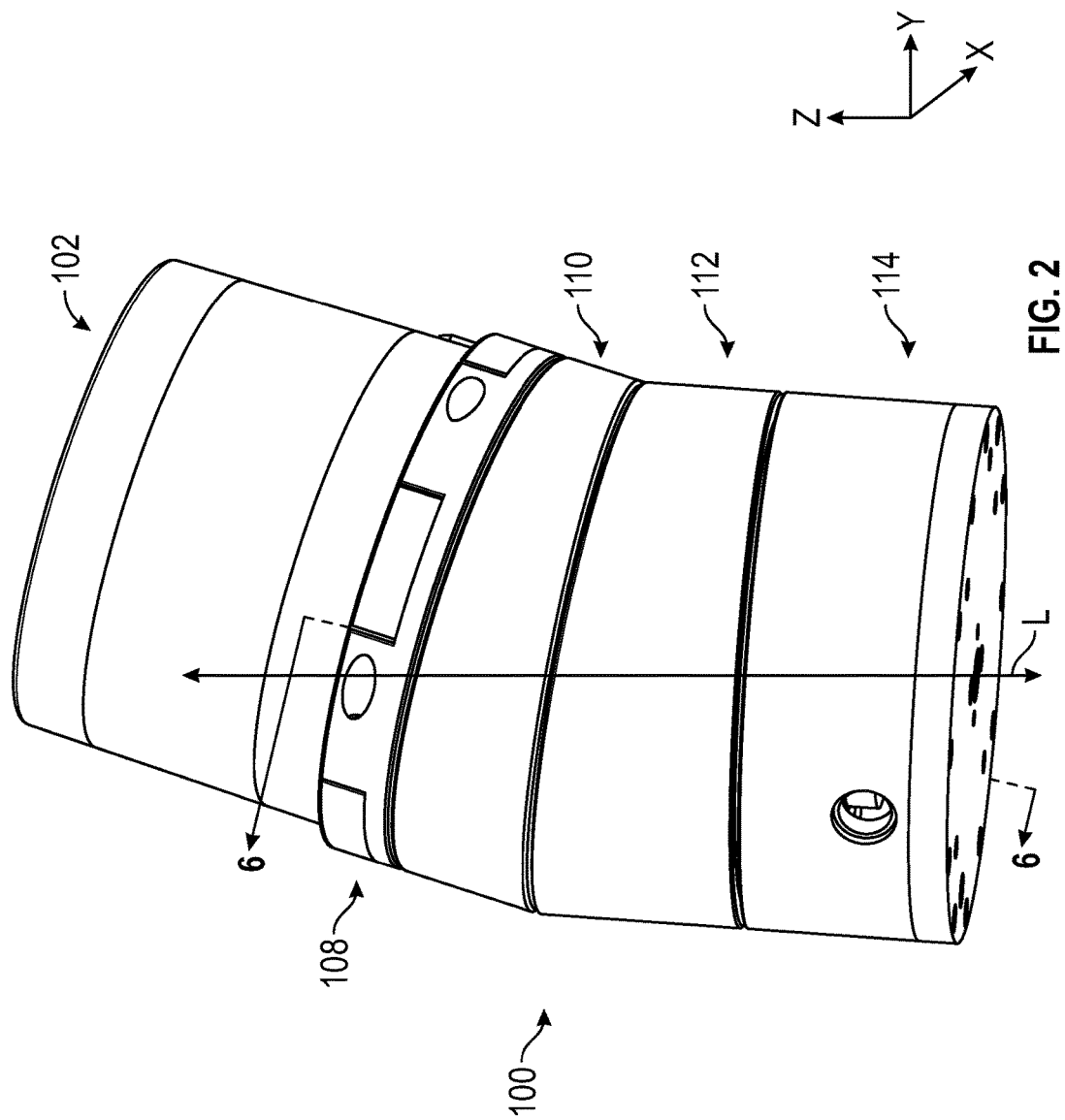

SYSTEMS AND METHODS FOR SENSOR PLATFORM

TECHNICAL FIELD

The present disclosure generally relates to sensor systems, and more particularly relates to systems and methods that provide two degrees of freedom in a sensor platform for use in an autonomous vehicle.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology and/or drive-by-wire systems to navigate the vehicle.

Certain sensing devices are mounted to the autonomous vehicle by a platform that enables the sensing device to move relative to the autonomous vehicle to provide a greater field of view for the sensing device. In these instances, in order to achieve a desired range of motion for the sensing device, a structure of the platform is cumbersome and portions of the structure may obstruct the field of view of the sensing device. Moreover, an accuracy of the sensing device may depend upon an accuracy of a position of the sensing device relative to the autonomous vehicle. In certain instances, the accuracy of the position may be compromised due to backlash within the platform.

Accordingly, it is desirable to provide a platform for a sensing device of an autonomous vehicle, which enables the sensing device to move relative to the autonomous vehicle without obstructing the field of view of the sensor. It is also desirable to provide a platform for the sensing device that provides an absolute position of the sensing device by minimizing or eliminating backlash within the platform. Furthermore, other desirable features and characteristics of the present invention will become apparent from the subsequent detailed description and the appended claims, taken in conjunction with the accompanying drawings and the foregoing technical field and background.

SUMMARY

In one embodiment, a method is provided for controlling a movement of a sensor platform. The method includes: receiving a desired position of the platform from a source, the desired position including a first coordinate value and a second coordinate value; based on the first coordinate value and the second coordinate value, calculating, by a processor, a first value associated with a first axis of rotation of the platform and calculating a second value associated with a second axis of rotation of the platform; and outputting, by the processor, one or more control signals to at least one motor associated with the platform to move the platform based on the first value and the second value.

In one embodiment, a system for controlling a movement of a platform for a sensor is provided. The system includes a source of a desired position of the platform that includes a first angular coordinate value and a second angular coordinate value. The system also includes a control module having a processor that receives the desired position, and based on the desired position: calculates a first value associated with a first axis of rotation of the platform; calculates a second value associated with a second axis of rotation of the platform; and outputs one or more control signals to at least one motor associated with the platform to move the platform based on at least one of the first value and the second value.

DESCRIPTION OF THE DRAWINGS

The exemplary embodiments will hereinafter be described in conjunction with the following drawing figures, wherein like numerals denote like elements, and wherein:

FIG. 2 is a perspective view of the sensor platform of FIG. 1A, which illustrates a first articulated position for the sensor platform, in accordance with various embodiments;

DETAILED DESCRIPTION

Figure 1A:
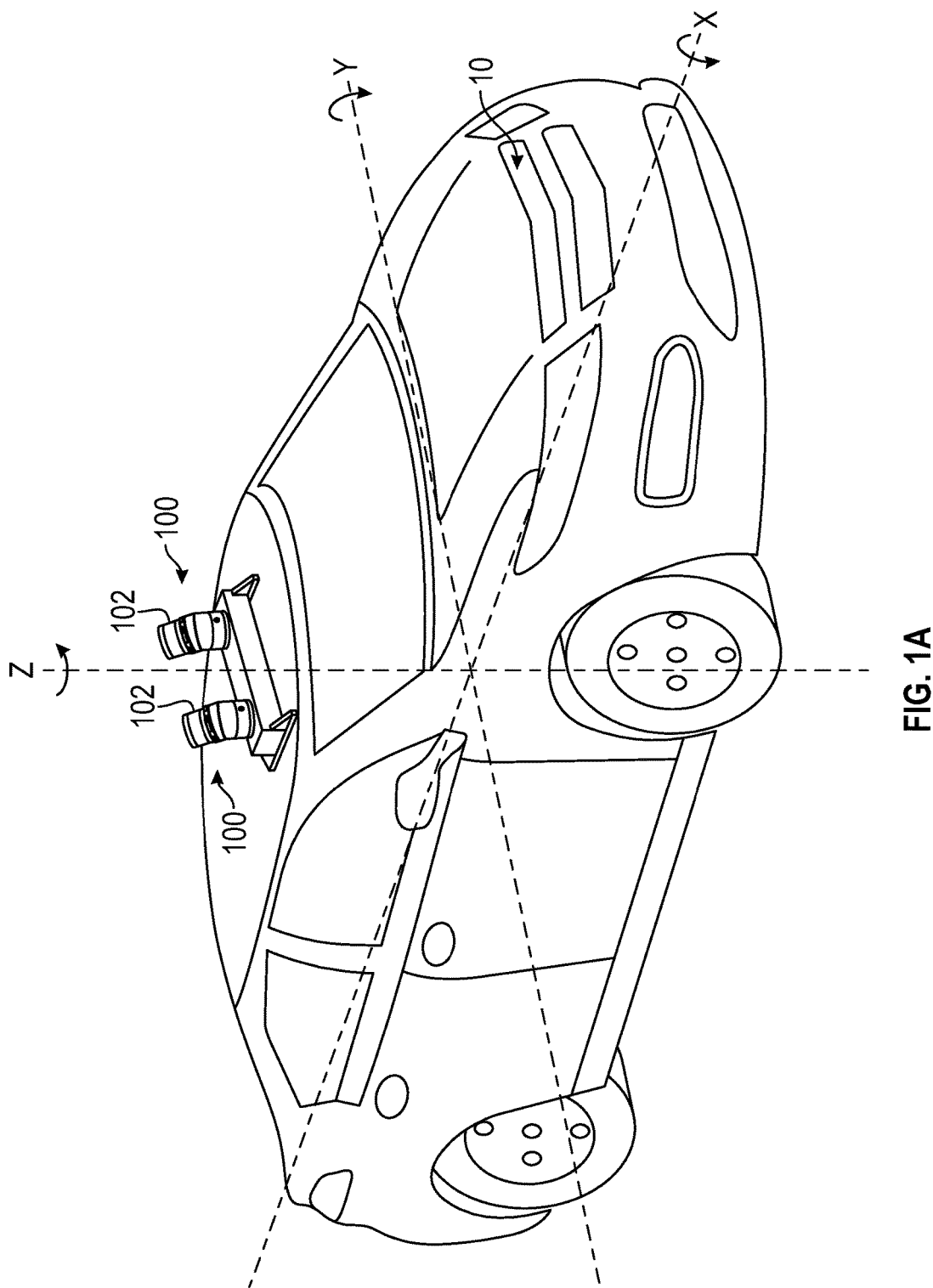
FIG. 1A is a perspective view of a vehicle having a sensor platform for a sensing device, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the sensor platform system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

With reference to FIG. 1A, a sensor platform system shown generally at 100 is associated with a vehicle 10 in accordance with various embodiments. The sensor platform system 100 movably couples at least one sensing device 102 to the vehicle 10. FIG. 1A illustrates the vehicle 10 as having two sensor platform systems 100, each with a respective one of two sensing devices 102 that operate in a same or similar manner. For ease of the description, only one of the sensor platform systems 100 and the sensing devices 102 will be described herein.

Figure 1B:
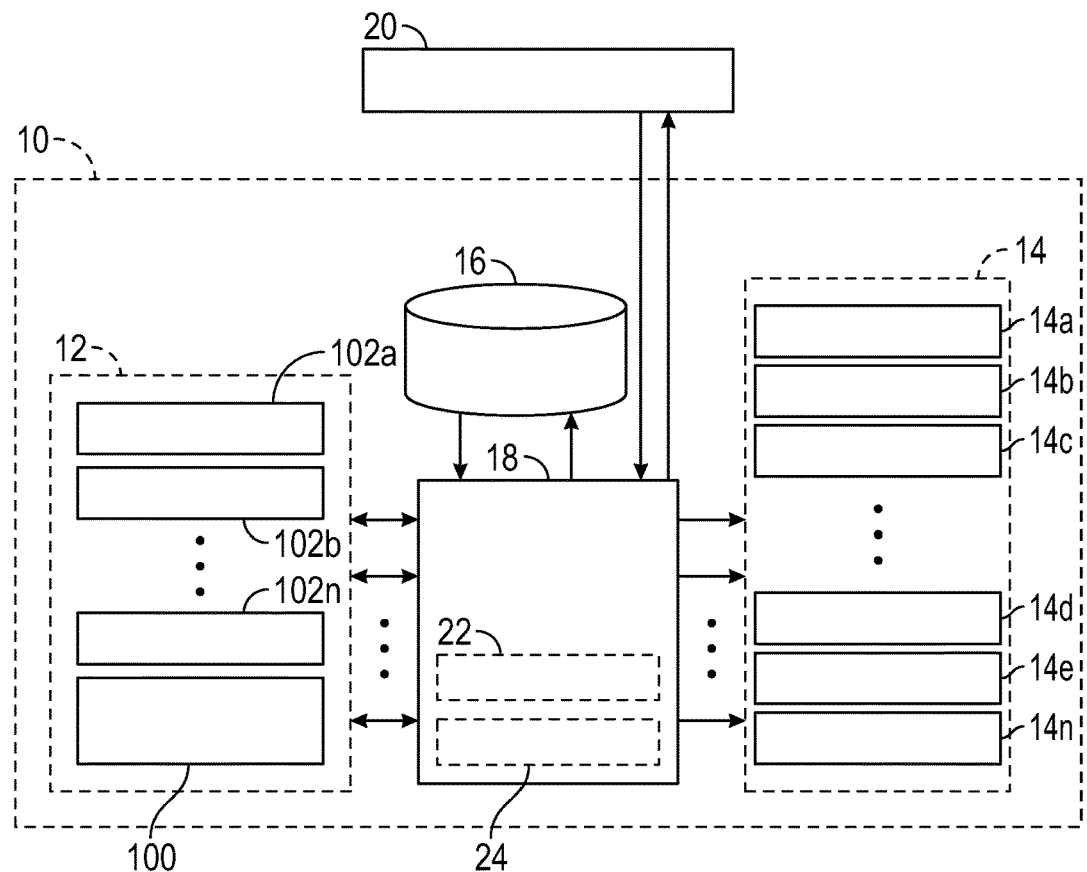
FIG. 1B is a functional block diagram illustrating an autonomous vehicle having a sensor platform, in accordance with various embodiments.

Generally, the sensor platform system 100 couples the sensing device 102 to the vehicle 10 such that the sensor platform system 100 is movable with two rotational degrees of freedom, which may enable the sensing device 102 to be movable with three rotational degrees of freedom. Generally, the sensor platform system 100 is stationary in yaw (e.g., stationary in rotation about the Z-axis) with respect to the vehicle 10 and movable in pitch (e.g., rotation about the Y-axis) and roll (e.g., rotation about the X-axis). In certain embodiments, the sensing device 102 is movable in yaw (e.g., rotation about the Z-axis), pitch (e.g., rotation about the Y-axis), and roll (e.g., rotation about the X-axis). In various embodiments, the sensor platform system 100 controls a movement of the sensing device 102 based on control signals received from at least one control module 18 (FIG. 1B). Although the figures shown herein depict an example with certain arrangements of elements, additional intervening elements, devices, features, or components may be present in an actual embodiment. It should also be understood that FIG. 1A is merely illustrative and may not be drawn to scale. Although the sensor platform system 100 is shown to be associated with an automobile in FIG. 1A, it should be noted that the sensor platform system 100 can be used with any suitable vehicle, such as an aircraft, ship, train, motorcycle, scooter, etc. Moreover, the sensor platform system 100 can be used in one or more non-vehicular or stationary applications.

In various embodiments, the vehicle 10 is an autonomous vehicle. An autonomous vehicle is, for example, a driverless vehicle that is automatically controlled to carry passengers from one location to another. FIG. 1B illustrates exemplary components that may be implemented in the vehicle 10 to achieve the automatic control of the vehicle 10. For example, components may include: a sensor system 12, an actuator system 14, a data storage device 16, and the at least one control module 18. The sensor system 12 includes one or more sensing devices 102a-102n that sense observable conditions of the exterior environment and/or interior environment of the vehicle 10. The sensing devices 102a-102n can include, but are not limited to, radars, lidars, and cameras. In various embodiments, the sensor system 12 includes the sensor platform system 100 that is associated with the sensing devices 102a-102n as described herein.

The actuator system 14 includes one or more actuator devices 14a-14n that control one or more vehicle components. In various embodiments, the vehicle components are associated vehicle operation and can include, but are not limited to, a throttle, brakes, and a steering system. In various embodiments, the vehicle components are associated with interior and/or exterior vehicle features and can include, but are not limited to, doors, a trunk, and cabin features such as air, music, lighting, etc.

The data storage device 16 stores data for use in automatically controlling the vehicle 10. In various embodiments, the data storage device 16 stores defined maps of the navigable environment. In various embodiments, the defined maps may be predefined by and obtained from a remote system 20. For example, the defined maps may be assembled by the remote system 20 and communicated to the vehicle 10

(wirelessly and/or in a wired manner) and stored by the control module 18 in the data storage device 16. As can be appreciated, the data storage device 16 may be part of the control module 18, separate from the control module 18, or part of the control module 18 and part of a separate system.

The control module 18 includes at least one processor 22 and memory 24. The processor 22 can be any custom made or commercially available processor, a central processing unit (CPU), an auxiliary processor among several processors associated with the control module 18, a semiconductor based microprocessor (in the form of a microchip or chip set), a macroprocessor, or generally any device for executing instructions. The memory 24 may be one or a combination of storage elements that store data and/or instructions that can be performed by the processor 22. The instructions may include one or more separate programs, each of which comprises an ordered listing of executable instructions for implementing logical functions.

The instructions, when executed by the processor 22, receive and process signals from the sensor system 12, perform logic, calculations, methods and/or algorithms for automatically controlling the components of the vehicle 10, and generate control signals to the actuator system 14 to automatically control the components of the vehicle 10 based on the logic, calculations, methods, and/or algorithms. Although only one control module 18 is shown in FIG. 1B, embodiments of the vehicle 10 can include any number of control modules 18 that communicate over any suitable communication medium or a combination of communication mediums and that cooperate to process the sensor signals, perform logic, calculations, methods, and/or algorithms, and generate control signals to automatically control features of the vehicle 10. In various embodiments, the instructions, when executed by the processor 22, control operation of the sensor platform system 100 as will be described in more detail below.

Figure 1C:
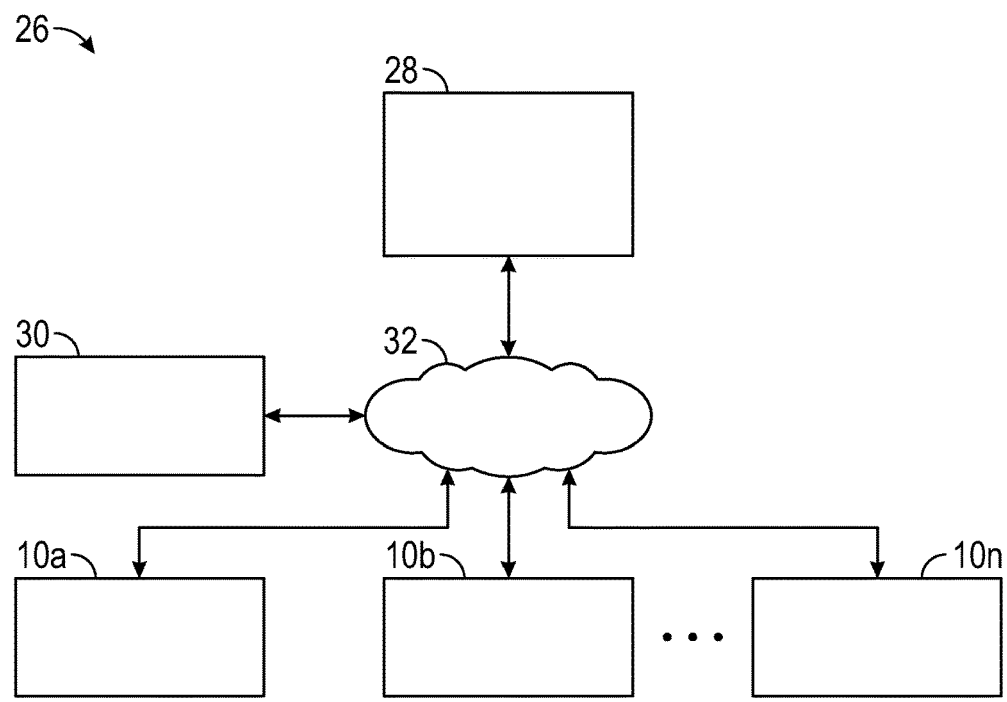
FIG. 1C is a functional block diagram illustrating a transportation system having one or more autonomous vehicles of FIG. 1B, in accordance with various embodiments.

In various embodiments, the autonomous vehicle described with regard to FIG. 1B may be suitable for use in the context of a taxi or shuttle system in a certain geographical area (e.g., a city, a school or business campus, a shopping center, an amusement park, an event center, or the like). For example, the autonomous vehicle 10 may be associated with an autonomous vehicle based transportation system. FIG. 1C illustrates an exemplary embodiment of an operating environment shown generally at 26 that includes an autonomous vehicle based transportation system 28 that is associated with one or more autonomous vehicles 10a-10n as described with regard to FIG. 1B. In various embodiments, the operating environment 26 includes the transportation system 28, at least one user device 30, and a communication network 32.

The communication network 32 supports communication as needed between devices, systems, and components supported by the operating environment 26 (e.g., via tangible communication links and/or wireless communication links). Although only one user device 30 is shown in FIG. 1C, embodiments of the operating environment 26 can support any number of user devices 30, including multiple user devices 30 owned, operated, or otherwise used by one person. Each user device 30 supported by the operating environment 26 may be implemented using any suitable hardware platform. In this regard, the user device 30 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 30 supported by the operating environment 26 is realized as a computer-implemented or computer-based device having the hardware, software, firmware, and/or processing logic needed to carry out the various techniques and methodologies described herein.

The autonomous vehicle based transportation system 28 includes one or more backend server systems, which may be cloud-based, network-based, or resident at the particular campus or geographical location serviced by the transportation system 28. The backend system can communicate with the user devices 30 and the autonomous vehicles 10a-10n to schedule rides, dispatch autonomous vehicles 10a-10n, and the like.

In accordance with a typical use case workflow, a registered user of the transportation system 28 can create a ride request via the user device 30. The ride request will typically indicate the passenger's desired pickup location (or current GPS location), the desired destination location (which may identify a predefined vehicle stop and/or a user-specified passenger destination), and a pickup time. The transportation system 28 receives the ride request, processes the request, and dispatches a selected one of the autonomous vehicles 10a-10n (when and if one is available) to pick up the passenger at the designated pickup location and at the appropriate time. The transportation system 28 can also generate and send a suitably configured confirmation message or notification to the user device 30, to let the passenger know that a vehicle is on the way.

As can be appreciated, the subject matter disclosed herein provides certain enhanced features and functionality to what may be considered as a standard or baseline autonomous vehicle and/or autonomous vehicle based transportation system 28. To this end, an autonomous vehicle and autonomous vehicle based transportation system can be modified, enhanced, or otherwise supplemented to provide the additional features described in more detail below.

With reference now to FIG. 2, the sensor platform system 100 will be described in more detail in accordance with various embodiments. In various embodiments, the sensor platform system 100 includes a sensor mount 108, a first articulation system 110, a second articulation system 112 and a base system 114. Generally, the sensor platform system 100 extends along a longitudinal axis L, with each of the first articulation system 110 and the second articulation system 112 extending along and movable relative to the longitudinal axis L. In one example, the first articulation system 110 and the second articulation system 112 are each independently rotatable relative to the longitudinal axis L.

Figure 3:
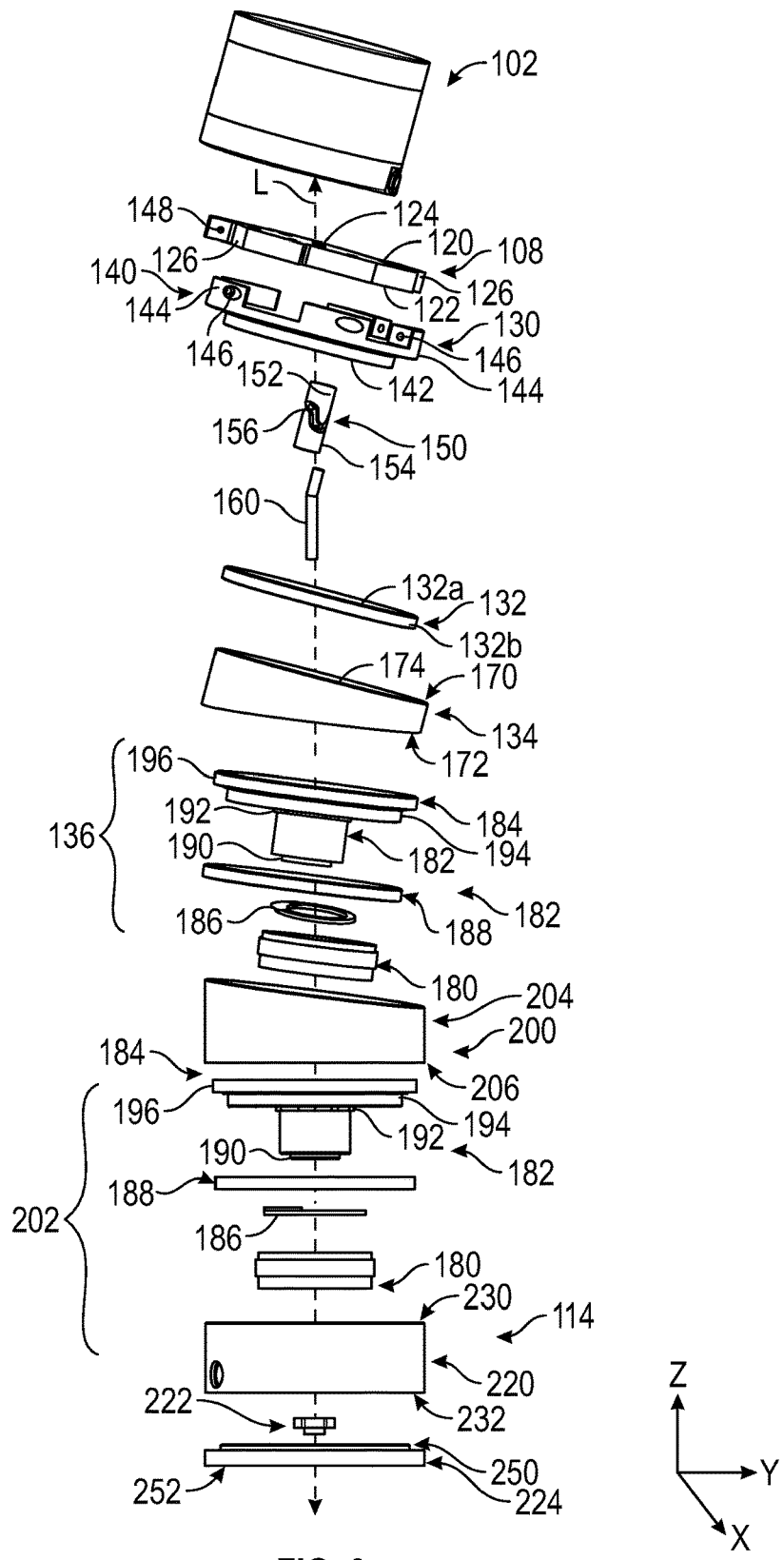
FIG. 3 is an exploded view of the sensor platform, in accordance with various embodiments.

The sensor mount 108 is coupled to the sensing device 102. In this example, with reference to FIG. 3, the sensor mount 108 is annular, and includes a first surface 120 opposite a second surface 122. The sensor mount 108 is generally composed of a metal or metal alloy, including, but not limited to aluminum; however, it will be understood that the sensor mount 108 may also be composed of any suitable polymeric material. The sensor mount 108 can be formed through any suitable technique, such as casting, molding, stamping, forging, selective laser sintering, etc. The first surface 120 is coupled to the sensing device 102. In one example, a bore 124 is defined through the first surface 120, which receives a mechanical fastener, including, but not limited to a screw, bolt, rivet, etc., to removably couple the sensing device 102 to the sensor mount 108. The second surface 122 is coupled to the first articulation system 110. Generally, the sensor mount 108 includes a plurality of recesses 126 defined through the first surface 120 and the second surface 122 about a perimeter of the sensor mount 108. The plurality of recesses 126 cooperate with and receive a portion of the first articulation system 110 to couple the first articulation system 110 to the sensor mount 108 such that a portion of the first articulation system 110 is received within the plurality of recesses 126 (FIG. 3).

The first articulation system 110 includes an interface 130, a bearing 132, a first articulation body or cylinder 134 and a first drive system 136. The interface 130 is annular, and is coupled to the sensor mount 108. The interface 130 is generally composed of metal or metal alloy, and in one example, is composed of aluminum. However, it will be understood that the interface 130 may be composed of any suitable polymeric material. The interface 130 can be formed through any suitable technique, such as, but not limited to, casting, molding, stamping, forging, selective laser sintering, etc. The interface 130 includes a first side 140 opposite a second side 142. The first side 140 includes a plurality of projections 144, which extend outwardly from the first side 140, in a direction substantially parallel with the longitudinal axis L. Each of the plurality of projections 144 are received within a respective one of the plurality of recesses 126 to couple the interface 130 to the sensor mount 108. In this example, one or more of the plurality of projections 144 define a bore 146, which cooperates with corresponding bores 148 defined in corresponding ones of the plurality of recesses 126 to receive a mechanical fastener, including, but not limited to a screw, bolt, etc., to couple the interface 130 to the sensor mount 108.

The second side 142 of the interface 130 has a diameter that is different than, and in this example, less than a diameter of the first side 140. Generally, the diameter of the second side 142 is different than the diameter of the first side 140 to form a seat for the bearing 132. The second side 142 also includes a joint 150. The joint 150 generally extends from the second side 142 along a central axis defined through the interface 130. The joint 150 includes a first post 152 and a second post 154, which are interconnected at a universal joint 156. The first post 152 is fixedly coupled to the second side 142, and the second post 154 is coupled to a flexible drive shaft 160 of the base system 114. The first post 152 is coupled to the second side 142 via any technique, such as, but not limited to, bonding, welding, mechanical fasteners, and can be integrally formed with the interface 130, if desired. As will be discussed further herein, the universal joint 156 cooperates with the flexible drive shaft 160 to fix the sensor mount 108 in yaw (Z-axis) with respect to the base system 114. In other words, the universal joint 156 enables the sensor mount 108 to roll (X-axis) and pitch (Y-axis) relative to the base system 114, while remaining stationary in yaw (Z-axis).

The bearing 132 seats about a circumference of the second side 142 of the interface 130 and is substantially cylindrical. In this example, the bearing 132 is a thrust bearing, including, but not limited to, a thrust ball bearing, a thrust roller bearing, etc. The bearing 132 facilitates the rotation of the first articulation cylinder 134 relative to the second articulation system 112, and supports axial loads generated from this relative rotation. The bearing 132 includes an inner ring 132a and an outer ring 132b. The inner ring 132a is coupled to the second side 142 of the interface 130, and the outer ring 132b is coupled to the first articulation cylinder 134.

Figure 4:
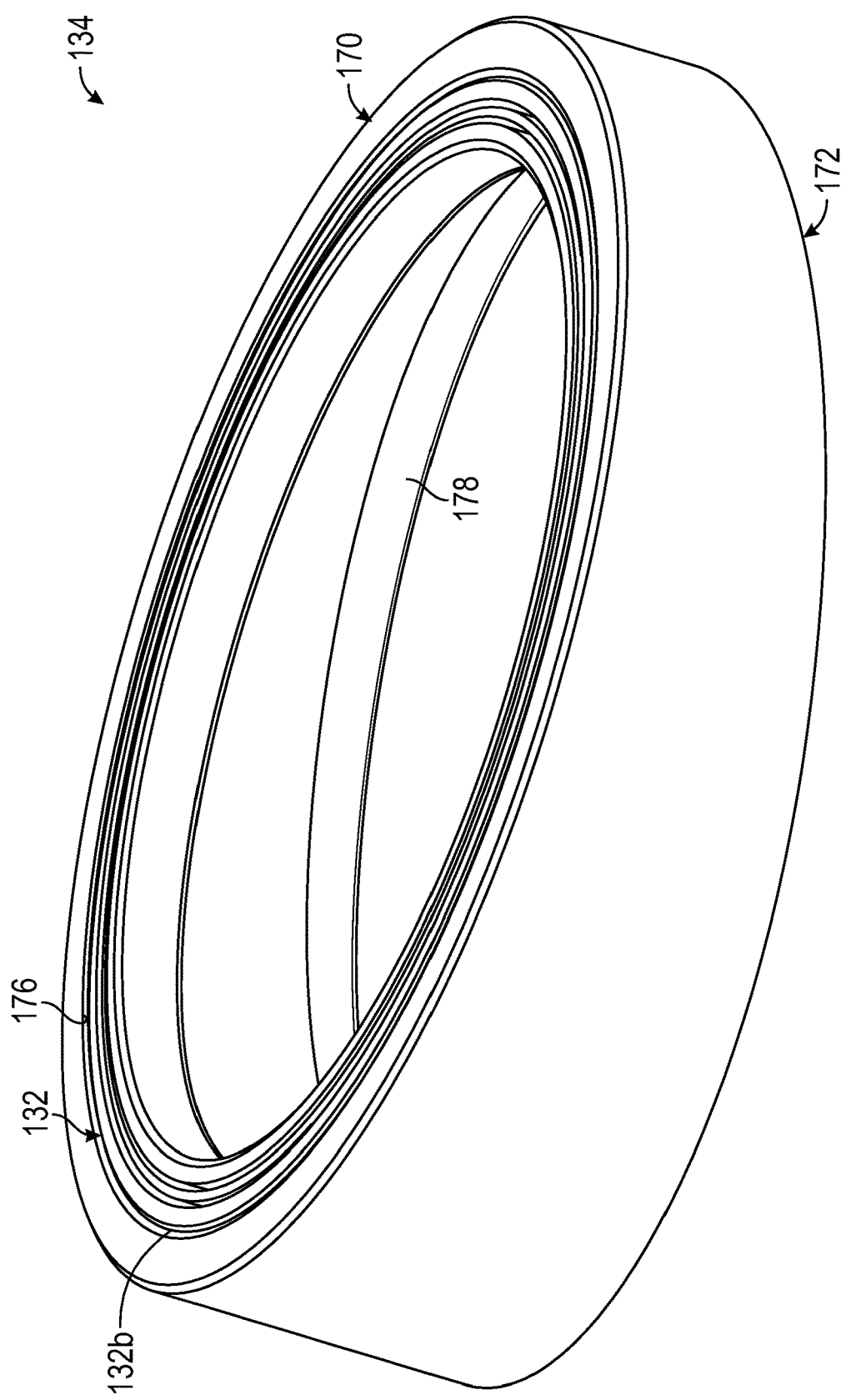
FIG. 4 is a perspective view of a first articulation body, which includes a bearing, of the sensor platform of FIG. 2, in accordance with various embodiments.

The first articulation cylinder 134 includes a first surface 170 opposite a second surface 172 and a first throughbore 174. With reference to FIG. 4, the first articulation cylinder 134 is substantially cylindrical, and may be substantially hollow. It should be noted that while the first articulation cylinder 134 is described and illustrated herein as having a cylindrical shape, the first articulation cylinder 134 need not be cylindrical, but may be any suitable shape. The first articulation cylinder 134 is composed of metal or metal alloy, and in one example, is composed of aluminum. However, it will be understood the first articulation cylinder 134 may be composed of any suitable polymeric material. The first articulation cylinder 134 can be formed through any suitable technique, such as, but not limited to, casting, molding, stamping, forging, selective laser sintering, etc. The first surface 170 defines a counterbore 176, which receives the outer ring 132b of the bearing 132.

Figure 5:
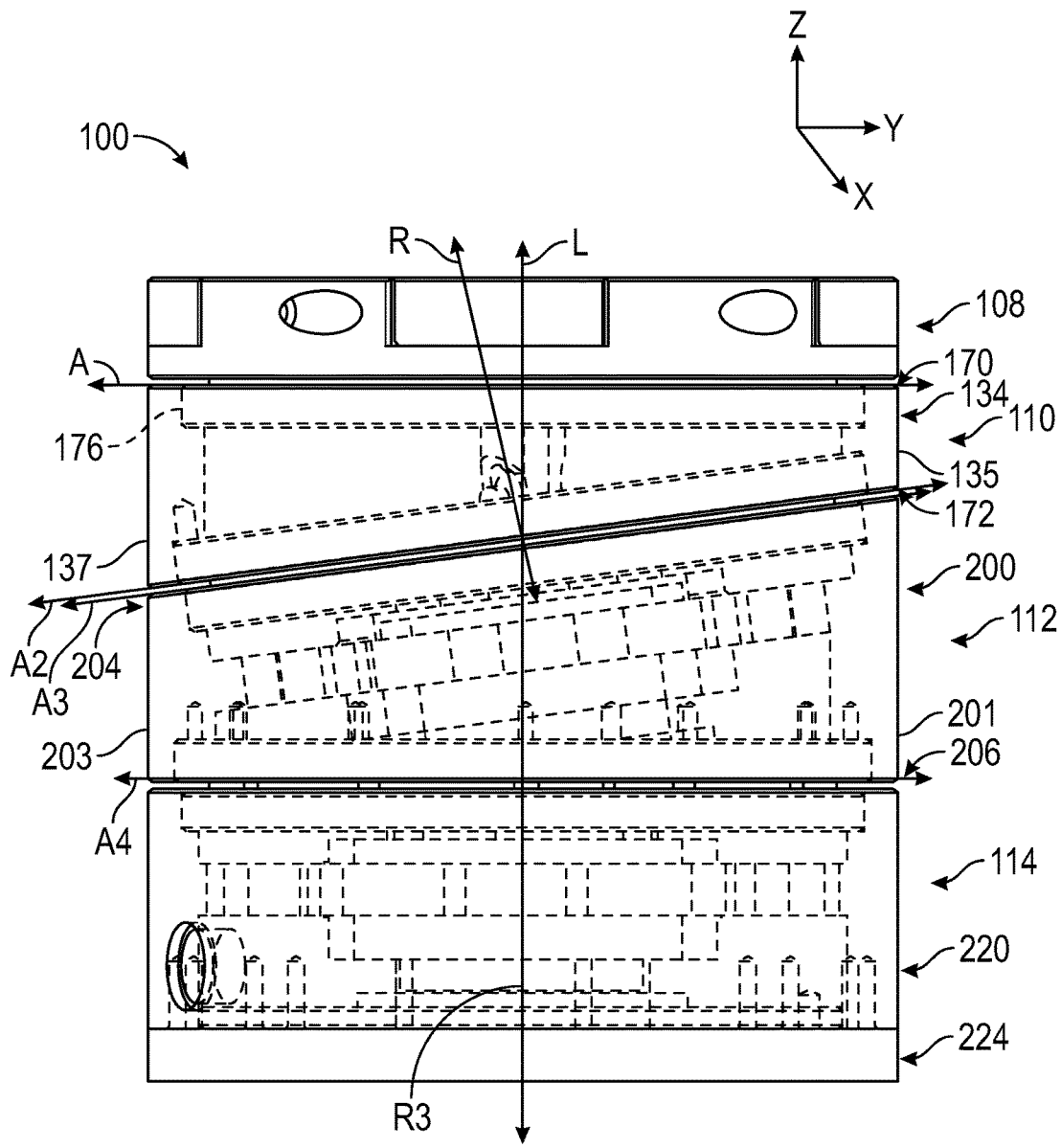
FIG. 5 is a side view of the sensor platform of FIG. 2, which illustrates a second or non-articulated position for the sensor platform, in accordance with various embodiments.

Generally, with reference to FIG. 5, the first surface 170 is planar and the second surface 172 is sloped or slanted to define a wedge-shaped element. As such, a first end 135 of the first articulation cylinder 134 has a length along the longitudinal axis L, which is less than a length of a second end 137 of the first articulation cylinder 134 along the longitudinal axis L. Stated another way, the first surface 170 extends along an axis A, which is substantially transverse or oblique to an axis A2 of the second surface 172. In other words, generally, the first articulation cylinder 134 has an axis of rotation R, and the first surface 170 has a radial axis that is substantially transverse or oblique to the axis of rotation R, while the second surface 172 has a radial axis that is substantially perpendicular to the axis of rotation R. Thus, the axis of rotation R of the first articulation cylinder 134 is substantially perpendicular to the second surface 172, and thus angularly offset to the first surface 170. In one example, the slant of the second surface 172 is about 7.5 degrees. Generally, the slant of the second surface 172 is $\theta_s$, which defines a maximum value for phi ($\varphi$) that can be input to control a motion of the sensor platform system 100, as will be discussed in detail below.

With reference to FIG. 4, the second surface 172 also defines a second counterbore 178. The second counterbore 178 receives a portion of the first drive system 136 to drive the first articulation cylinder 134. The second surface 172 also optionally defines a pin hole 179, which receives a dowel pin to assist in assembling the first articulation system 110.

The first throughbore 174 is defined through the first articulation cylinder 134 from the first surface 170 to the second surface 172. The first throughbore 174 is sized to enable the rotation of the first articulation cylinder 134 relative to the joint 150 such that the first articulation cylinder 134 does not contact the joint 150.

With reference to FIG. 3, the first drive system 136 directly drives the first articulation cylinder 134. The first drive system 136 includes a motor 180, a spindle 182, a drive ring 184, a position sensor 186 and a second, drive system bearing 188. In this example, with reference to FIG. 6, the motor 180, the spindle 182, the position sensor 186, the drive system bearing 188 and a portion of the drive ring 184 are received within the second articulation system 112, such that the motor 180, the spindle 182, the position sensor 186, the drive system bearing 188 and a portion of the drive ring 184 are nested within the second articulation system 112. Thus, at least a portion of the first drive system 136 couples the first articulation system 110 to the second articulation system 112.

Generally, the motor 180 comprises a brushless direct current ring motor. The motor 180 is in communication with the control module 18 over a communication architecture that facilitates the transfer of power, data, commands, control signals, etc. The spindle 182 is received though a bore defined by a rotor 180a of the motor 180, and is coupled to the rotor 180a to be driven by the rotation of the rotor 180a. The spindle 182 is coupled to the rotor 180a via any suitable technique, including, but not limited to, adhesives, a splined coupling, welding, press-fit, etc. In one example, the spindle 182 is bonded, via an adhesive, to the rotor 180a. The spindle 182 is generally composed of a metal or metal alloy, including, but not limited to, aluminum. However, it will be understood the spindle 182 may be composed of any suitable polymeric material. The spindle 182 can be formed through any suitable technique, such as, but not limited to, casting, molding, stamping, forging, selective laser sintering, etc. The spindle 182 is generally cylindrical (FIG. 3), and has a first end 190 coupled to the position sensor 186 and a second end 192 coupled to the drive ring 184. The spindle 182 defines the axis of rotation R for the first articulation cylinder 134. Generally, the motor 180 receives one or more control signals from the control module 18, which causes the motor 180 to drive the spindle 182 in the desired direction, such as clockwise or counterclockwise about the axis of rotation R. As the spindle 182 is coupled to the drive ring 184, which is coupled to the first articulation cylinder 134, the rotation of the spindle 182 results in a corresponding movement of the first articulation cylinder 134. In one example, the first articulation cylinder 134 is movable about the axis of rotation R through about 360 degrees.

The drive ring 184 includes a first, base portion 194 and a second, engagement portion 196. The drive ring 184 is composed of metal or metal alloy, and in one example, is composed of aluminum. However, it will be understood the drive ring 184 may be composed of any suitable polymeric material. The drive ring 184 can be formed through any suitable technique, such as, but not limited to, casting, molding, stamping, forging, selective laser sintering, etc. In this example, the base portion 194 has a diameter that is different, and generally smaller than, the engagement portion 196. The base portion 194 is coupled to the second end 192 of the spindle 182, and may include one or more sprockets and a hub to assist in transferring load or torque from the spindle 182 to the drive ring 184. The base portion 194 can be coupled to the spindle 182 via any technique, such as adhesive, press-fit, spline coupling, welding, etc., and can be integrally formed with the spindle 182. The diameter of the base portion 194 is generally sized to define a seat for the drive system bearing 188, as will be discussed further herein.

The engagement portion 196 extends outwardly from the base portion 194, and is coupled to the first articulation cylinder 134. The engagement portion 196 is annular (FIG. 3), and the diameter is sized to be received within the second counterbore 178 to couple the drive ring 184 to the first articulation cylinder 134. In one example, the engagement portion 196 is bonded to the second counterbore 178 via an adhesive; however, the engagement portion 196 may be fixedly coupled to the second counterbore 178 via any technique, such as welding, press-fit, etc. Thus, the engagement portion 196 is not received or nested within the second articulation system 112.

The position sensor 186 observes the first end 190 of the spindle 182 and generates sensor signals based thereon. The position sensor 186 is in communication with the control module 18 over a communication architecture that facilitates the transfer of data, power, commands, control signals, etc. Generally, the position sensor 186 is an encoder, which generates sensor signals based on the observed position of the spindle 182. In one example, the position sensor 186 is an absolute rotary encoder, which observes an angular position or motion of the spindle 182 and generates sensor signals based thereon. As the position sensor 186 is coupled or mounted directly on the spindle 182 and the spindle 182 directly drives the first articulation cylinder 134 via the drive ring 184, direct feedback is provided to the control module 18 of the position of the spindle 182, and thus, the position of the first articulation cylinder 134, thereby increasing an accuracy of a position of the sensor platform system 100.

The drive system bearing 188 seats about the base portion 194 of the drive ring 184 and is substantially cylindrical (FIG. 3). In this example, the drive system bearing 188 is a thrust bearing, including, but not limited to, a thrust ball bearing, a thrust roller bearing, etc. The drive system bearing 188 facilitates the rotation of the first articulation cylinder 134 relative to the second articulation system 112, and supports axial loads generated from this relative rotation. The drive system bearing 188 includes an inner ring 188a and an outer ring 188b. The inner ring 188a is coupled to the base portion 194 of the drive ring 184, and the outer ring 188b is coupled to the second articulation system 112.

Figure 7:
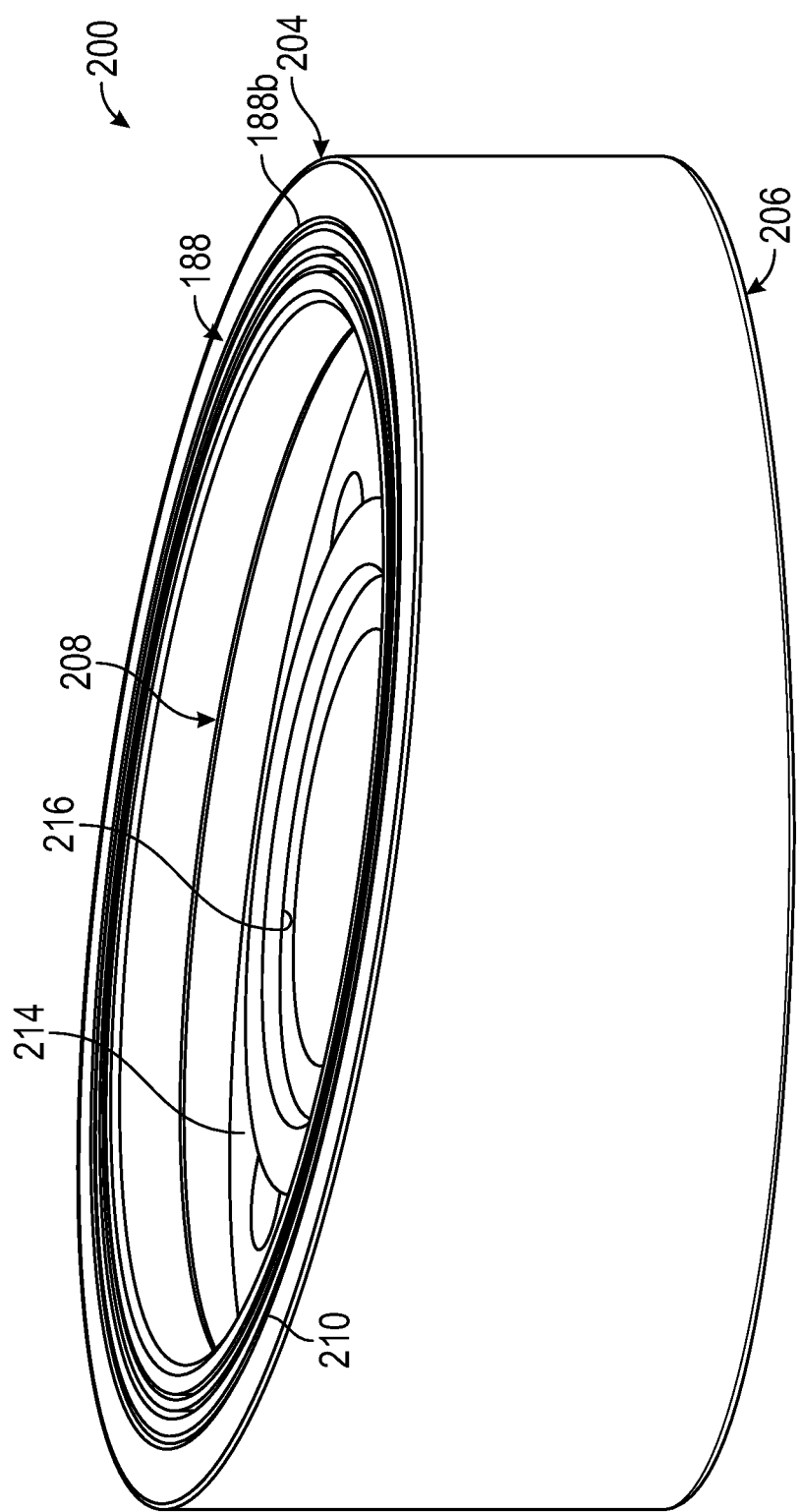
FIG. 7 is a perspective view of a second articulation body, which includes a bearing, of the sensor platform of FIG. 2, in accordance with various embodiments.

The second articulation system 112 cooperates with the first articulation system 110 to move the sensing device 102 in the two degrees of freedom. With reference to FIG. 3, the second articulation system 112 includes a second articulation body or cylinder 200 and a second drive system 202. With reference to FIG. 7, the second articulation cylinder 200 includes a third surface 204 opposite a fourth surface 206 and a second throughbore 208. The second articulation cylinder 200 is substantially cylindrical, and may be substantially hollow. It should be noted that while the second articulation cylinder 200 is described and illustrated herein as having a cylindrical shape, the second articulation cylinder 200 need not be cylindrical, but may be any suitable shape. The second articulation cylinder 200 is generally composed of metal or metal alloy, and in one example, is composed of aluminum. However, it will be understood the second articulation cylinder 200 may be composed of any suitable polymeric material. The second articulation cylinder 200 can be formed through any suitable technique, such as, but not limited to, casting, molding, stamping, forging, selective laser sintering, etc. The third surface 204 defines a third counterbore 210, which receives the outer ring 188b of the drive system bearing 188.

Figure 10:
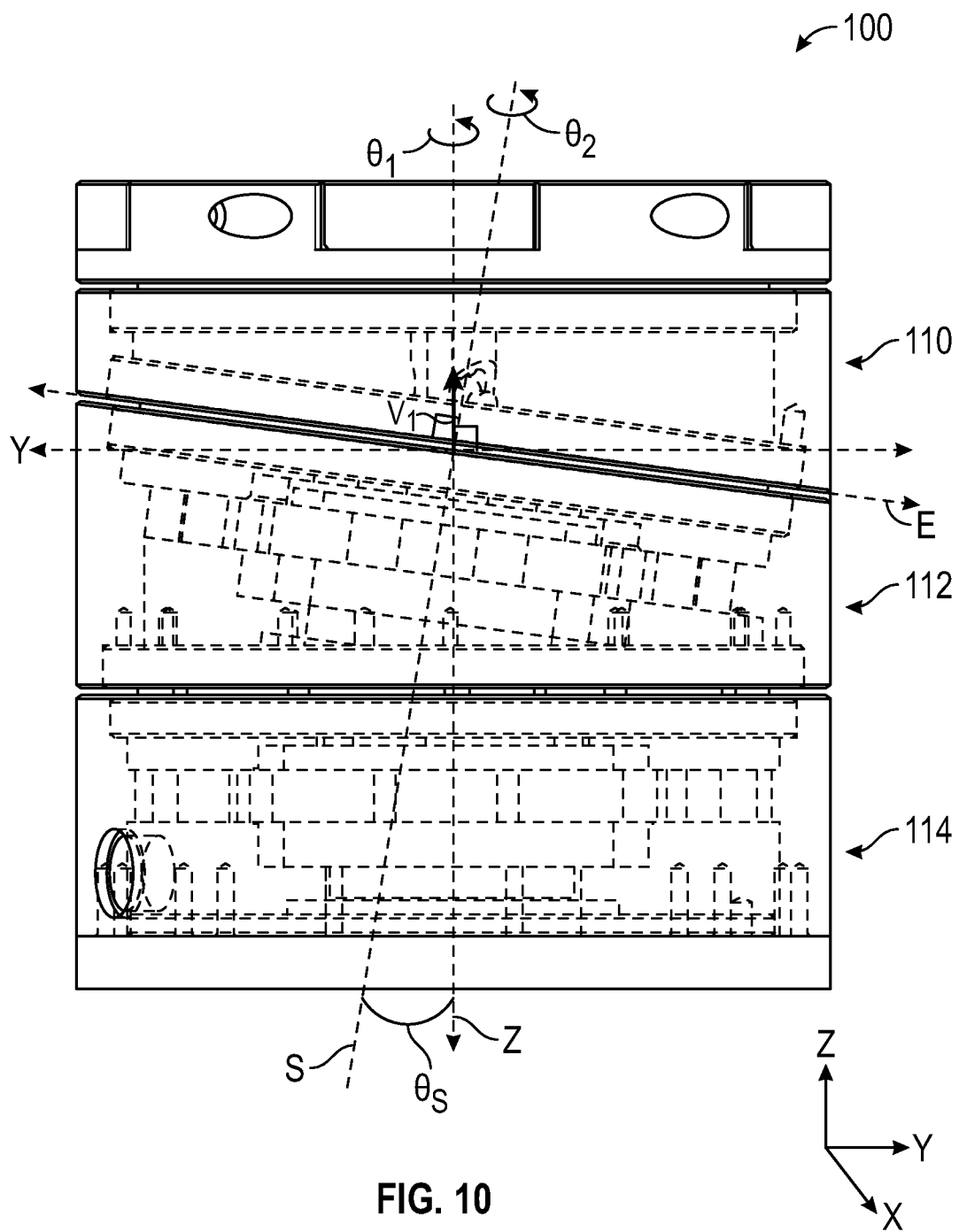
FIG. 10 is side view of the sensor platform of FIG. 2, which illustrates a portion of a spherical coordinate system for the sensor platform, with the sensor platform in a neutral position, in accordance with various embodiments.

Generally, with reference to FIG. 5, the third surface 204 is sloped or slanted with respect to the fourth surface 206 and the fourth surface 206 is planar to define a wedge-shaped element. As such, a first end 201 of the second articulation cylinder 200 has a length along the longitudinal axis L, which is greater than a length of a second end 203 of the second articulation cylinder 200 along the longitudinal axis L. Stated another way, the third surface 204 extends along an axis A3, which is substantially transverse or oblique to an axis A4 of the fourth surface 206. In other words, generally, the second articulation cylinder 200 has an axis of rotation R3, and the third surface 204 has a radial axis that is substantially perpendicular to the axis of rotation R3, while the fourth surface 206 has a radial axis that is substantially transverse or oblique to the axis of rotation R3. The axis of rotation R3 of the second articulation system 112 is substantially parallel to the longitudinal axis L, while the axis of rotation R of the first articulation system 110 is substantially transverse or oblique to the longitudinal axis L. Thus, the axis of rotation R3 of the second articulation cylinder 200 is substantially perpendicular to the third surface 204 and thus angularly offset with respect to the fourth surface 206. In one example, the slant of the third surface 204 with respect to the fourth surface 206 is about 7.5 degrees. Generally, the slant of the third surface 204 is equal to the slant of the second surface 172 to provide for a neutral position, as illustrated in FIG. 10.

With reference back to FIG. 5, the slanted second surface 172 of the first articulation cylinder 134 and the slanted third surface 204 of the second articulation cylinder 200 cooperate to define between about positive 15 degrees and about negative 15 degrees of motion for the sensing device 102 in pitch (Y-axis) and roll (X-axis) relative to the longitudinal axis L due to the respective 7.5 degrees slant of the second surface 172 and the third surface 204. In this example, the longitudinal axis L is substantially parallel to the Z-axis. Stated another way, the first articulation system 110 and the second articulation system 112 are independently movable by the respective one of the first drive system 136 and the second drive system 202 to define two degrees of rotational freedom for the sensor platform system 100. Generally, the axis of rotation R of the first articulation cylinder 134 of the first articulation system 110 is different than, and in this example, is transverse or angularly offset with respect to the axis of rotation R3 of the second articulation cylinder 200 of the second articulation system 112 such that a rotational vector defined by the rotation of the first articulation cylinder 134 is different than a rotational vector defined by the rotation of the second articulation cylinder 200. Thus, the sensor platform system 100 defines two different rotational vectors, which result in the two degrees of freedom movement for the sensing device 102 relative to the vehicle 10. Stated another way, the axis of rotation R of the first articulation cylinder 134 of the first articulation system 110 is different than, and in this example, is transverse or angularly offset with respect to the axis of rotation R3 of the second articulation cylinder 200 of the second articulation system 112 such that a rotation of a unit vector $V_1$ (FIG. 10) about the axis of rotation R3 and the axis of rotation R results in the two degrees of freedom movement for the sensing device 102 relative to the vehicle 10. In addition, it should be noted that any substantially equal combinations of slants for the second surface 172 and the third surface 204 can be employed to result in a desired range of motion for the sensor platform system 100.

Figure 6:
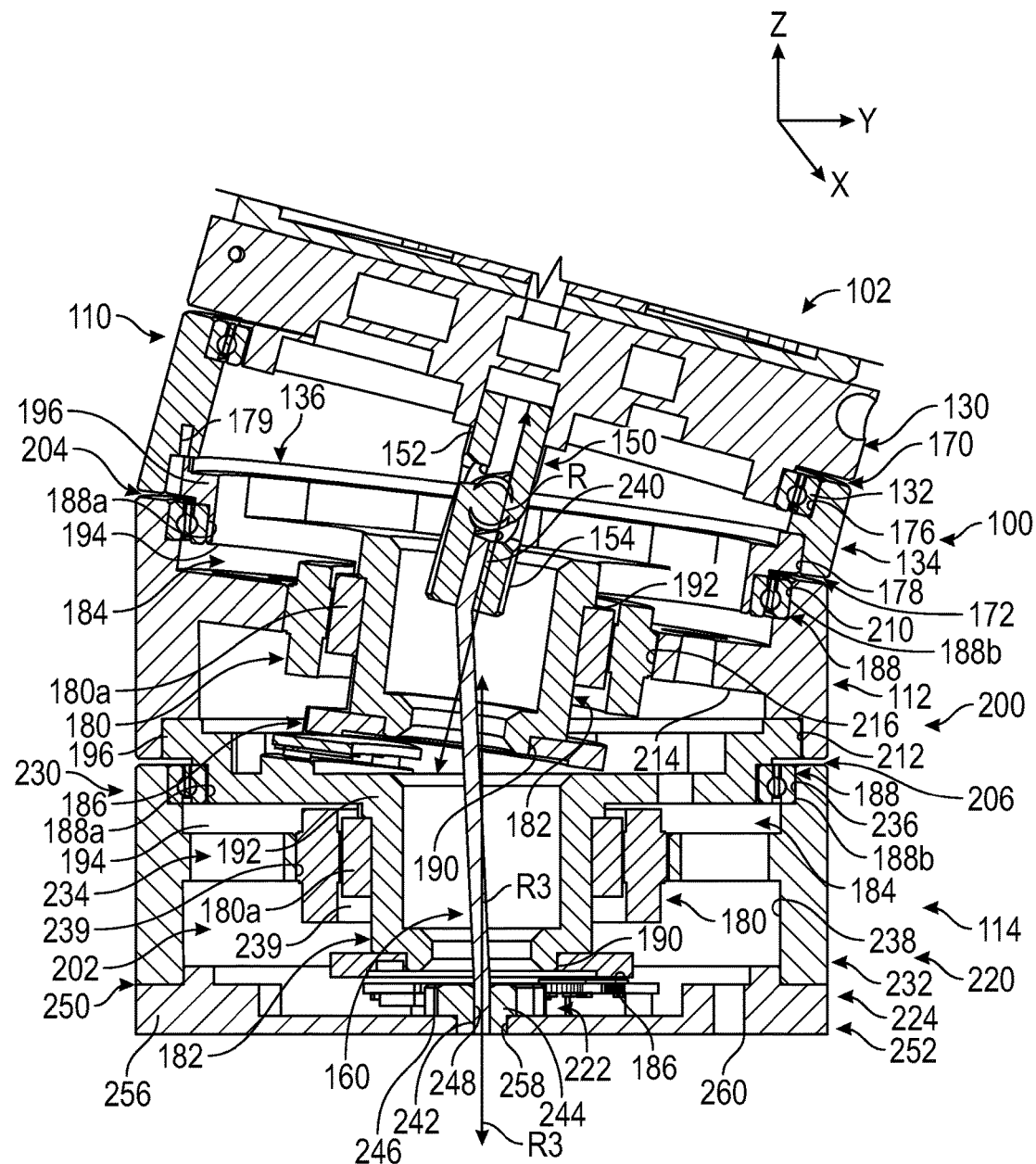
FIG. 6 is a cross-sectional view of the sensor platform of FIG. 2, taken along line 6-6 of FIG. 2, in accordance with various embodiments.

With reference to FIG. 6, the fourth surface 206 also defines a fourth counterbore 212. The fourth counterbore 212 receives a portion of the second drive system 202 to drive the second articulation cylinder 200. The fourth surface 206 also optionally defines a pin hole, which receives a dowel pin to assist in assembling the second articulation system 112. The fourth surface 206 optionally defines a plurality of bores, which receive one or more mechanical fasteners, such as bolts, screws, etc., to removably couple a portion of the second drive system 202 to the second articulation cylinder 200. In this regard, the one or more mechanical fasteners are removable for maintenance and inspection of the first drive system 136 that is positioned within the second articulation cylinder 200.

The second throughbore 208 is defined through the second articulation cylinder 200 from the third surface 204 to the fourth surface 206. The second throughbore 208 is sized to receive the first drive system 136 and in one example, the second throughbore 208 includes an annular flange 214. The annular flange 214 defines a bore 216 that is coupled to the motor 180 of the first drive system 136. The annular flange 214 supports the motor 180, while enabling the second articulation cylinder 200 to move relative to the first drive system 136. The annular flange 214 can also include one or more bores, which can provide a mass savings. The second throughbore 208 also enables the flexible drive shaft 160 to pass through the second articulation cylinder 200 without contacting the second articulation cylinder 200.

As the second drive system 202 can be similar to the first drive system 136, the same reference numerals will be used to denote the same or substantially similar components. The second drive system 202 directly drives the second articulation cylinder 200. The second drive system 202 includes the motor 180, the spindle 182, the drive ring 184, the position sensor 186 and the drive system bearing 188. In this example, the motor 180, the spindle 182, the position sensor 186, the drive system bearing 188 and a portion of the drive ring 184 are received within the base system 114, such that the motor 180, the spindle 182, the position sensor 186, the drive system bearing 188 and a portion of the drive ring 184 are nested within the base system 114.

The motor 180 of the second drive system 202 is in communication with the control module 18 over a communication architecture that facilitates the transfer of power, data, commands, control signals, etc. The spindle 182 is received though a bore defined by the rotor 180a of the motor 180, and is coupled to the rotor 180a to be driven by the rotation of the rotor 180a. The spindle 182 is generally cylindrical, and has the first end 190 coupled to the position sensor 186 and the second end 192 coupled to the drive ring 184. The spindle 182 defines the axis of rotation R3 for the second articulation cylinder 200. Generally, the motor 180 receives one or more control signals from the control module 18, which causes the motor 180 to drive the spindle 182 in the desired direction, such as clockwise or counterclockwise about the axis of rotation R3. As the spindle 182 is coupled to the drive ring 184, which is coupled to the second articulation cylinder 200, the movement of the spindle 182 results in a corresponding movement of the second articulation cylinder 200. In one example, the second articulation cylinder 200 is movable about the axis of rotation R3 through about 360 degrees.

The drive ring 184 includes the first, base portion 194 and the second, engagement portion 196. The base portion 194 is coupled to the second end 192 of the spindle 182, and may include one or more sprockets and a hub to assist in transferring load or torque from the spindle 182 to the drive ring 184. The diameter of the base portion 194 is generally sized to define a seat for the drive system bearing 188.

The engagement portion 196 extends outwardly from the base portion 194, and is coupled to the second articulation cylinder 200. The engagement portion 196 is annular (FIG. 3), and the diameter is sized to be received within the fourth counterbore 212 to couple the drive ring 184 to the second articulation cylinder 200. In one example, the engagement portion 196 is bonded to the fourth counterbore 212 via an adhesive; however, the engagement portion 196 may be fixedly coupled to the fourth counterbore 212 via any technique, such as welding, press-fit, etc. Optionally, the engagement portion 196 can include one or more bores that cooperate with the one or more bores 216 of the fourth surface 206 to receive the plurality of mechanical fasteners. Thus, the engagement portion 196 is not received or nested within the base system 114.

The position sensor 186 observes the first end 190 of the spindle 182 and generates sensor signals based thereon. The position sensor 186 is in communication with the control module 18 over a communication architecture that facilitates the transfer of data, power, commands, control signals, etc. As the position sensor 186 is coupled or mounted directly on the spindle 182 and the spindle 182 directly drives the second articulation cylinder 200 via the drive ring 184, direct feedback is provided to the control module 18 of the position of the spindle 182, and thus, the position of the second articulation cylinder 200, thereby increasing an accuracy of a position of the sensor platform system 100.

The drive system bearing 188 seats about the base portion 194 of the drive ring 184 and is substantially cylindrical. The drive system bearing 188 facilitates the rotation of the second articulation cylinder 200 relative to the first articulation system 110, and supports axial loads generated from this relative rotation. The drive system bearing 188 includes the inner ring 188a and the outer ring 188b. The inner ring 188a is coupled to the base portion 194 of the drive ring 184, and the outer ring 188b is coupled to the base system 114.

Figure 8:
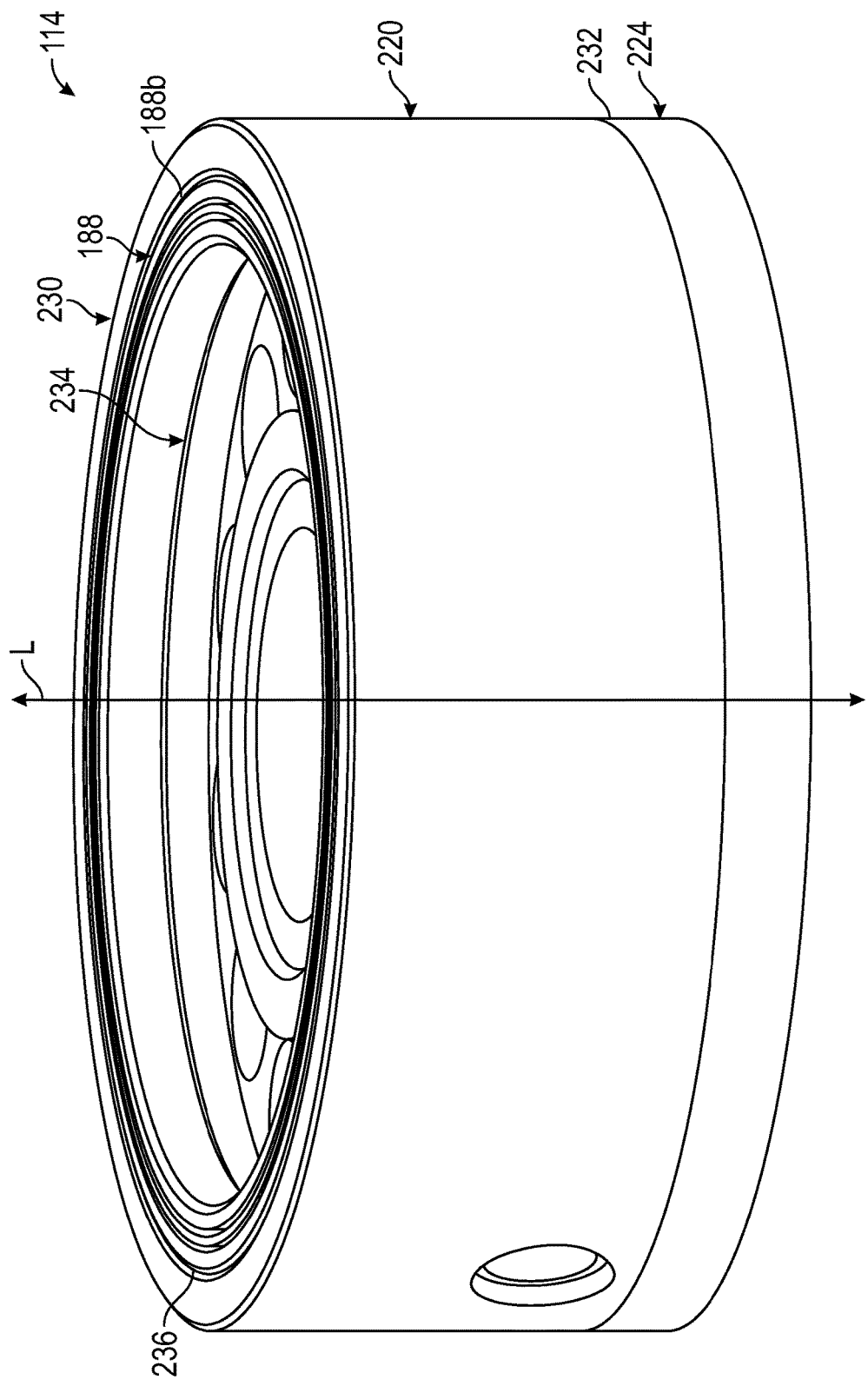
FIG. 8 is a perspective view of a body of a base of the sensor platform of FIG. 2, which includes a bearing, in accordance with various embodiments.

The base system 114 receives the portion of the second drive system 202. The base system 114 supports the first articulation system 110, the second articulation system 112, the sensor mount 108 and the sensing device 102, and is coupled to the vehicle 10. With reference to FIG. 3, the base system 114 includes a body 220, the flexible drive shaft 160, a shaft coupling 222 and a base plate 224. With reference to FIG. 8, the body 220 is generally cylindrical, and is composed of metal or metal alloy, and in one example, is composed of aluminum. However, it will be understood the body 220 may be composed of any suitable polymeric material. The body 220 can be formed through any suitable technique, such as, but not limited to, casting, molding, stamping, forging, selective laser sintering, etc. The body 220 defines a fifth surface 230, a sixth surface 232 and a throughbore 234 that extends through the body 220 along the longitudinal axis L. With reference to FIG. 6, the fifth surface 230 defines a fifth counterbore 236, which receives the outer ring 188b of the drive system bearing 188 and the base portion 194 of the second drive system 202 to enable the drive ring 184 to rotate relative to the base system 114.

The sixth surface 232 of the body 220 defines one or more bores about a perimeter of the sixth surface 232 for receipt of one or more mechanical fasteners, such as screws, bolts, etc., to removably couple the body 220 to the base plate 224. The mechanical coupling between the body 220 and the base plate 224 facilitates maintenance and inspection of the second drive system 202.

The throughbore 234 extends through the body 220 from the fifth surface 230 to the sixth surface 232. The throughbore 234 is sized to receive the portion of the second drive system 202 and in one example, the throughbore 234 includes an annular flange 238. The annular flange 238 defines a bore 239 that is coupled to the motor 180 of the second drive system 202 such that the annular flange 238 supports the motor 180. The annular flange 214 can also include one or more bores, which can provide a mass savings. The throughbore 234 also receives a portion of the base plate 224 to couple the body 220 to the base plate 224.

The flexible drive shaft 160 is substantially cylindrical, and interconnects the interface 130 with the base plate 224. The flexible drive shaft 160 is generally composed of a plurality of metal or metal alloy wires, which are wrapped in layers to define a substantially cylindrical shaft. The flexible drive shaft 160 includes a first end 240 and a second end 242. The first end 240 is coupled to the second post 154 of the joint 150, and the second end 242 is coupled to the shaft coupling 222. In one example, the first end 240 and the second end 242 are coupled to the respective one of the second post 154 and the shaft coupling 222 via bonding with an adhesive, however, welding, mechanical fasteners, etc. can also be employed. The flexible drive shaft 160 enables the rotation of the first articulation cylinder 134 relative to the second articulation cylinder 200 in pitch (Y-axis) and roll (X-axis), while preventing motion in yaw (Z-axis). Stated another way, the flexible drive shaft 160 enables the rotation of the first articulation cylinder 134 relative to the second articulation cylinder 200 in pitch (Y-axis) and roll (X-axis), while isolating the interface 130 from any motion in yaw (Z-axis) and allowing the motion in pitch (Y-axis) and roll (X-axis).

The shaft coupling 222 is coupled to the second end 242 of the flexible drive shaft 160. In this example, the shaft coupling 222 includes a cylindrical body 244 and a circular flange 246. The shaft coupling 222 is composed of metal or metal alloy, and in one example, is composed of aluminum. The shaft coupling 222 can be formed through any suitable technique, such as, but not limited to, casting, molding, stamping, forging, selective laser sintering, etc. The cylindrical body 244 defines a bore 248, which receives the second end 242 of the flexible drive shaft 160. The flange 246 extends outwardly from the cylindrical body 244 and assists with coupling the shaft coupling 222 to the base plate 224.

The base plate 224 is coupled to the body 220 and to the vehicle 10. The base plate 224 is generally cylindrical and is composed of a metal or metal alloy, including, but not limited to, aluminum. The base plate 224 can be formed through any suitable technique, such as, but not limited to, casting, molding, stamping, forging, selective laser sintering, etc. The base plate 224 includes a first base side 250, a second base side 252 and can include one or more bores 254 defined through the first base side 250 and the second base side 252 that cooperate with the one or more bores of the body 220 to removably couple the body 220 to the base plate 224. The first base side 250 is coupled to the sixth surface 232 of the body 220, and in one example, the sixth surface 232 can also be bonded via an adhesive to the first base side 250 to further secure the body 220 to the base plate 224. The first base side 250 defines an annular lip 256, which is received within a portion of the throughbore 234 to assist in coupling the body 220 to the base plate 224. The first base side 250 also defines a receiving bore 258, which receives the shaft coupling 222 to couple the shaft coupling 222 to the base plate 224. The shaft coupling 222 can be press-fit into the receiving bore 258, or coupled to the receiving bore 258 via an adhesive, mechanical fastener, etc.

The second base side 252 is coupled to the vehicle 10. The second base side 252 may include one or more mounting features such as one or more bores 260, which receive a mechanical fastener, including, but not limited to a bolt, screw, etc., to assist in fixedly, but removably, coupling the sensor platform system 100 to the vehicle 10. It should be noted that the sensor platform system 100 can be coupled to the vehicle 10 at any desired location, and moreover, the sensor platform system 100 can be coupled to or mounted on a support coupled to the vehicle 10, if desired, as illustrated in FIG. 1A.

With reference to FIGS. 3-8, in order to assemble the sensor platform system 100, in one example, with the joint 150 coupled to the interface 130, the bearing 132 is coupled about the second side 142 of the interface 130. The flexible drive shaft 160 is coupled to the second post 154 of the joint 150, and the first articulation cylinder 134 is coupled about the bearing 132. The engagement portion 196 of the drive ring 184 of the first drive system 136 is coupled to the first articulation cylinder 134 at the second counterbore 178, and the spindle 182 is coupled to the rotor 180a of the motor 180. The drive system bearing 188 is coupled about the base portion 194 of the drive ring 184, and the portion of the first drive system 136 is positioned within the second articulation cylinder 200 such that the drive system bearing 188 is coupled to the third counterbore 210. The position sensor 186 is coupled to the spindle 182.

The engagement portion 196 of the drive ring 184 of the second drive system 202 is coupled to the second articulation cylinder 200 at the fourth counterbore 212, and the spindle 182 is coupled to the rotor 180a of the motor 180 of the second drive system 202. The drive system bearing 188 is coupled about the base portion 194 of the drive ring 184 and the portion of the second drive system 202 is positioned within the body 220 such that the drive system bearing 188 is coupled to the fifth counterbore 236. The position sensor 186 is coupled to the spindle 182 of the second drive system 202. The shaft coupling 222 is coupled to the flexible drive shaft 160, and the shaft coupling 222 is coupled to the base plate 224 such that the flexible drive shaft 160 interconnects the interface 130 with the base plate 224. The base plate 224 is coupled to the body 220. The sensor mount 108 is coupled to the interface 130, and the sensing device 102 can be coupled to the sensor mount 108. With the sensor platform system 100 assembled, the sensor platform system 100 can be coupled to the vehicle 10.

Generally, the sensor platform system 100 is coupled to the vehicle 10 such that each of the motors 180 and the position sensors 186 are in communication with the control module 18. Each of the motors 180 are responsive to one or more control signals to rotate a respective one of the first articulation cylinder 134 about the axis of rotation R and the second articulation cylinder 200 about the axis of rotation R3. As the axis of rotation R is angularly offset from or transverse to the axis of rotation R3, the relative rotation between the first articulation cylinder 134 and the second articulation cylinder 200 results in the two degrees of freedom for the motion of the sensor platform system 100, without obstructing a field of view of the sensing device 102 coupled to the sensor mount 108. Further, as each of the first articulation cylinder 134 and the second articulation cylinder 200 are directly driven by a respective spindle 182 and drive ring 184, the respective position sensor 186 provides direct feedback as to the position of the first articulation cylinder 134 and the second articulation cylinder 200, which results in improved accuracy in the determination of a position for the sensor platform system 100. Moreover, as the sensor mount 108, the interface 130 and the base plate 224 are interconnected via the flexible drive shaft 160, the sensor platform system 100 is constrained in yaw (Z-axis) such that movement in yaw (Z-axis) is minimized or eliminated.

In one embodiment, the sensing device 102 comprises a lidar sensor, which in this example, has the shape of a beacon. It will be understood, however, that the sensing device 102 may include any suitable sensing device for use with the vehicle 10, including, but not limited to a radar sensor, an image sensor, etc. The sensing device 102 observes conditions associated with an environment about the vehicle 10, and generates sensor signals based thereon. The sensing device 102 communicates these sensor signals over a suitable architecture that facilitates the transfer of data, commands, power, control signals, etc. to the control module 18. In various embodiments, the sensing device 102 may be in wireless or wired communication with the control module 18.

The control module 18 outputs one or more control signals to the motor 180 of the first drive system 136 and the second drive system 202 based on inputs received from other modules of the vehicle 10 and based on the control systems and methods of the present disclosure. In various embodiments, the control module 18 outputs one or more first control signals to the motor 180 of the first drive system 136 and outputs one or more second control signals to the motor 180 of the second drive system 202 based on the sensor signals from the position sensors 186, inputs received from other modules of the vehicle 10 and based on the control systems and methods of the present disclosure.

Figure 9:
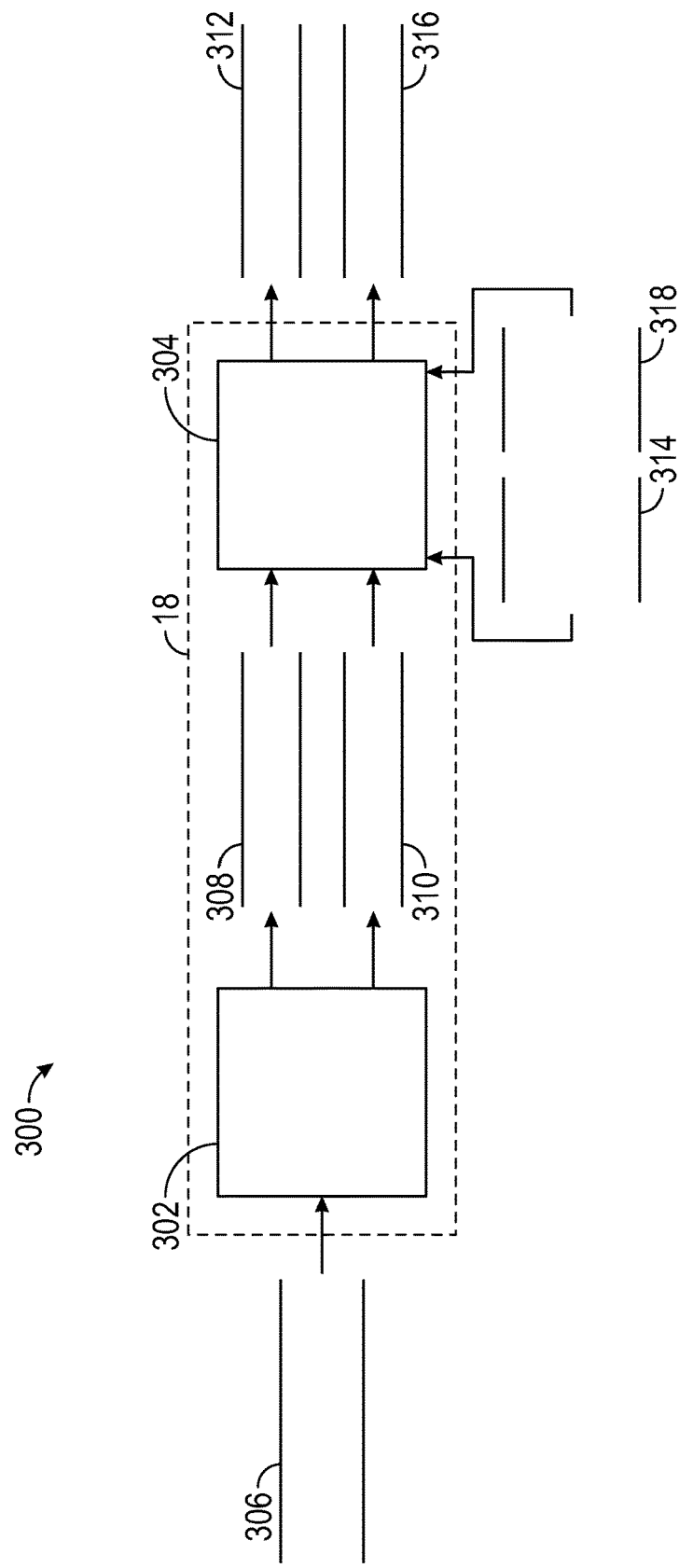
FIG. 9 is a dataflow diagram illustrating a control system of the sensor platform of FIG. 2, in accordance with various embodiments.

Referring now to FIG. 9, and with continued reference to FIGS. 2-8, a dataflow diagram illustrates various embodiments of a control system 300 for the sensor platform system 100, which may be embedded within the control module 18. Various embodiments of the control system 300 according to the present disclosure can include any number of sub-modules embedded within the control module 18. As can be appreciated, the sub-modules shown in FIG. 9 can be combined and/or further partitioned to similarly control the motor 180 of the first drive system 136 and the motor 180 of the second drive system 202. Inputs to the control system 300 may be received from the position sensors 186 (FIG. 3), received from other control modules (not shown) associated with the vehicle 10, and/or determined/modeled by other sub-modules (not shown) within the control module 18. In various embodiments, the control module 18 includes a position determination module 302 and a movement control module 304.

The position determination module 302 receives as input desired position data 306. The desired position data 306 includes a desired orientation of the sensor platform system 100 in, for example, spherical coordinates. Generally, the desired position data 306 is received in the form of two angular coordinates theta (θ), phi (φ). In one example, the desired position data 306 is received from other modules associated with the vehicle 10, for example, based on a desired orientation for a field of view associated with the sensing device 102.

Based on the received desired position data 306, the position determination module 302 calculates angles $\theta_1$ and $\theta_2$ to achieve the desired orientation for the sensor platform system 100, while optimizing for a smallest amount of rotation. Generally, the position determination module 302 determines any pitch and roll combination of a top plane by rotating a top plane and a bottom plane with respect to each other. Stated another way, the position determination module 302 determines any pitch and roll actuated combination of a top plane by rotating respectively the first articulation cylinder 134 and the second articulation cylinder 200.

For example, with reference to FIG. 10, a neutral orientation for the sensor platform system 100 is shown. The orientation of a top plane of the sensor platform system 100 is defined by a unit vector $V_1$, which is orthogonal to the top plane of the sensor mount 108 of the sensor platform system 100. The movement of the first articulation cylinder 134 about the axis of rotation R is treated as a vector rotation about an S-axis, and the movement of the second articulation cylinder 200 about the axis of rotation R3 is treated as a vector rotation about the Z-axis.

By projecting the vector $V_1$ onto the Y-Z plane, as vector $V_1$ rotates about the S-axis, the projection forms an angle $\theta_s$ between the Z-axis and the vector $V_1$ that is between 0 and $\theta_s$. This angle $\theta_s$ is half of the maximum phi (φ) that can be input to the sensor platform system 100. This rotation combined with the rotation about the Z-axis provides the full range of motion for the sensor platform system 100. Stated another way, the movement of the sensor platform system 100 is constrained by (theta (θ), phi (φ)), where theta (θ) can be any number and phi (φ) is based on the following equation:

$$\varphi \le 2(\theta_s) \quad (1)$$

Based on the theta (θ), phi (φ) received from the desired position data 306, the position determination module 302 determines $\theta_s$ using equation (1) and solves the following equation to calculate angle $\theta_2$:

$$\theta_2 = 2\pi n + \arccos(\cot(-\theta_s)\tan(\varphi - \theta_s)) \quad (2)$$

The position determination module 302 solves equation (2) based on the following conditions:

$$\tan(\theta_s) \neq 0; \quad (3)$$

$$-\frac{1}{2}(-2\theta_s - \pi) < \varphi < \frac{1}{2}(\pi - 2\theta_s); \text{ and} \quad (4)$$

$$n \in Z \quad (5)$$

Wherein $\theta_2$ is an angle of rotation for the first articulation cylinder 134 about the axis of rotation R, and n is an integer. For example, based on an input phi (φ) of about 15 degrees, $\theta_2$ is about 180 degrees, which results in a rotation of the first articulation cylinder 134 180 degrees from the neutral position shown in FIG. 10. Generally, the relationship between phi (φ) and angle $\theta_2$ is non-linear. Based on the calculation of angle $\theta_2$, the position determination module 302 solves the following equation to calculate angle $\theta_1$:

$$\theta_1 = \theta - \theta_2 \quad (6)$$

Wherein $\theta_1$ is an angle of rotation for the second articulation cylinder 200 about the axis of rotation R3.

Generally, angle $\theta_1$ and angle $\theta_2$ comprise absolute positions for the spindle 182 of the second drive system 202 about the axis of rotation R3 and the spindle 182 of the first drive system 136 about the axis of rotation R, respectively. The position determination module 302 sets angle $\theta_1$ 308 and sets angle $\theta_2$ 310 for the movement control module 304.

Based on angle $\theta_1$ 308, the movement control module 304 outputs one or more control signals 312 for the motor 180 of the second drive system 202 to move the spindle 182, and thus, the second articulation cylinder 200, about the axis of rotation R3 to the position of angle $\theta_1$. In various embodiments, the movement control module 304 can convert the received angle $\theta_1$ 308 into the one or more control signals 312 for the motor 180. In various embodiments, the movement control module 304 can convert the received angle $\theta_1$ 308 based on a table stored in memory, such as the memory 24.

In various embodiments, the movement control module 304 also receives as input first sensor data 314. The first sensor data 314 includes the sensor signals received from the position sensor 186 of the second drive system 202, which provides feedback as to the measured position of the motor 180 of the second drive system 202. Based on the first sensor data 314, in one example, the movement control module 304 determines a position of the second articulation cylinder 200. In various embodiments, the movement control module 304 also determines whether the motor 180 of the second drive system 202 is in the orientation of angle $\theta_1$ 308. In various embodiments, the movement control module 304 can output an error signal based a difference in the measured position of the motor 180 of the second drive system 202, and the orientation of the motor 180 based on the one or more control signals 312. In addition, the first sensor data 314 can be received as input to other modules associated with the vehicle 10.

Based on angle $\theta_2$ 310, the movement control module 304 outputs one or more control signals 316 for the motor 180 of the first drive system 136 to move the spindle 182, and thus, the first articulation cylinder 134 about the axis of rotation R to the position of angle $\theta_2$. In various embodiments, the movement control module 304 can convert the received angle $\theta_2$ 310 into the one or more control signals 316 for the motor 180. In various embodiments, the movement control module 304 can convert the received angle $\theta_2$ 310 based on a table stored in memory, such as the memory 24.

In various embodiments, the movement control module 304 also receives as input second sensor data 318. The second sensor data 318 includes the sensor signals received from the position sensor 186 of the first drive system 136, which provides feedback as to the measured position of the motor 180 of the first drive system 136. Based on the second sensor data 318, in one example, the movement control module 304 determines a position of the first articulation cylinder 134. In various embodiments, the movement control module 304 also determines whether the motor 180 of the first drive system 136 is in the orientation of angle $\theta_2$ 310. In various embodiments, the movement control module 304 can output an error signal based a difference in the measured position of the motor 180 of first drive system 136, and the orientation of the motor 180 based on the one or more control signals 316. In addition, the second sensor data 318 can be received as input to other modules associated with the vehicle 10. In addition, in various embodiments, the movement control module 304 can determine a position of the sensor platform system 100 based on the determined position of the first articulation cylinder 134 and the second articulation cylinder 200, which can be output to other modules associated with the vehicle 10.

Figure 11:
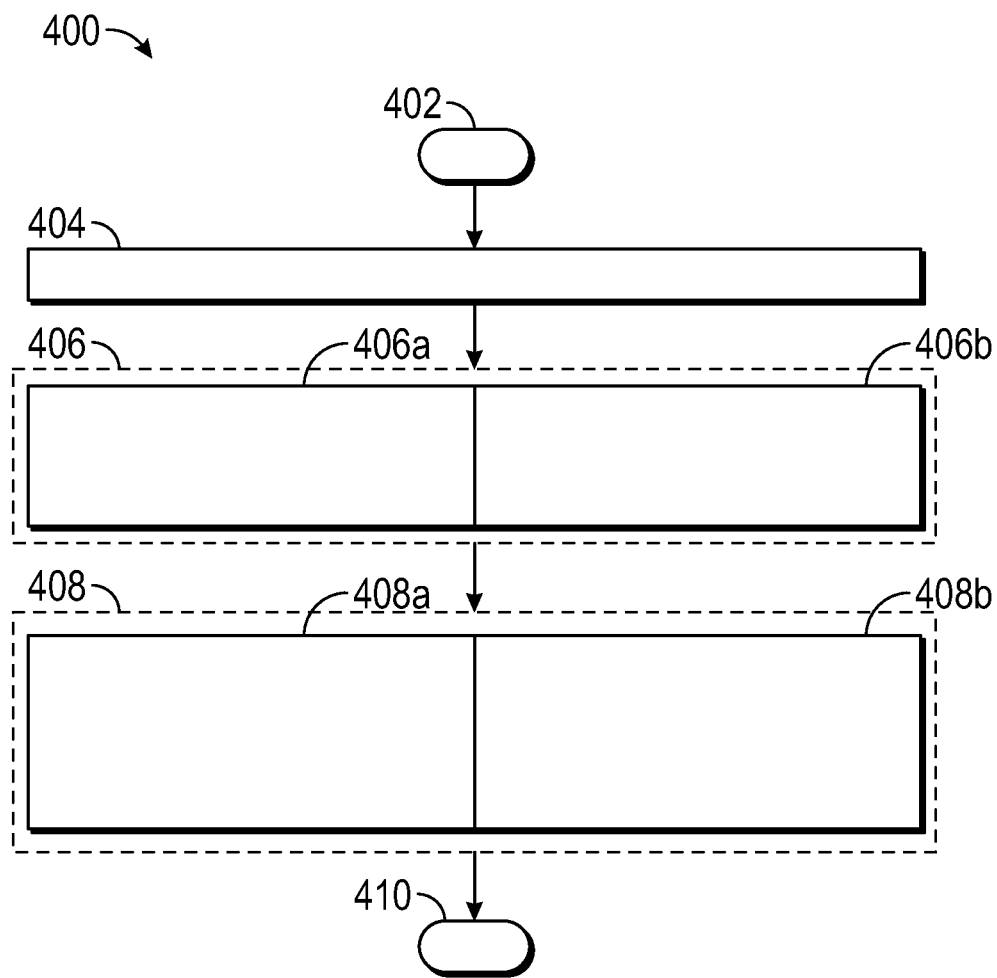
FIG. 11 is a flowchart illustrating a control method for controlling the sensor platform of FIG. 2, in accordance with various embodiments.

Referring now to FIG. 11, and with continued reference to FIGS. 1A-10, a flowchart illustrates a control method 400 that can be performed by the control module 18 of FIG. 1B in accordance with the present disclosure. As can be appreciated in light of the disclosure, the order of operation within the method is not limited to the sequential execution as illustrated in FIG. 11, but may be performed in one or more varying orders as applicable and in accordance with the present disclosure.

In various embodiments, the method can be scheduled to run based on predetermined events, and/or can run based on the receipt of desired position data 306.

The method begins at 402. At 404, the method receives as input the desired position data 306. At 406, based on the desired position data 306, the method calculates angle $\theta_2$ with equations (1)-(5) discussed herein above at 406a, and also calculates angle $\theta_1$ with equation (6) at 406b. At 408, the method outputs one or more control signals 312 for the motor 180 of the second drive system 202 to move the second articulation cylinder 200 based on the calculated angle $\theta_1$ at 408a, and outputs one or more control signals 316 for the motor 180 of the first drive system 136 to move the first articulation cylinder 134 based on the calculated angle $\theta_2$ at 408b. The method ends at 410.

It should be noted that while the method is illustrated herein as outputting the one or more control signals 312 and the one or more control signals 316 substantially simultaneously to result in synchronous movement of the sensor platform system 100, the method is not so limited. In this regard, the method can output the one or more control signals 312 for the first drive system 136 at a first time interval, and can output the one or more control signals 316 for the second drive system 202 at a second time interval such that the sensor platform system 100 moves in an asynchronous manner.

Figure 12:
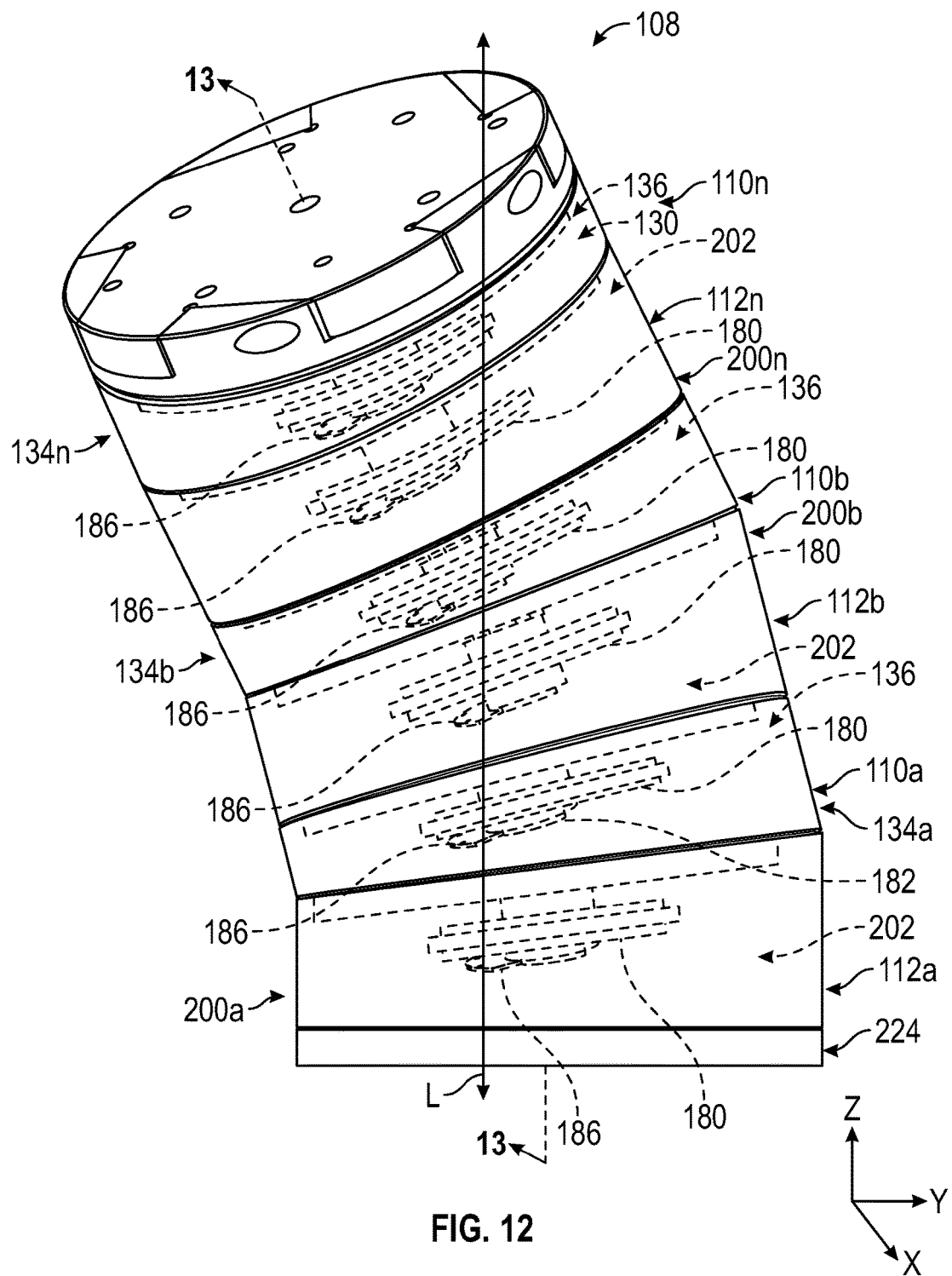
FIG. 12 is a perspective view of another sensor platform for use with the vehicle of FIG. 1A, which illustrates a first articulated position for the sensor platform, in accordance with various embodiments.
Figure 13:
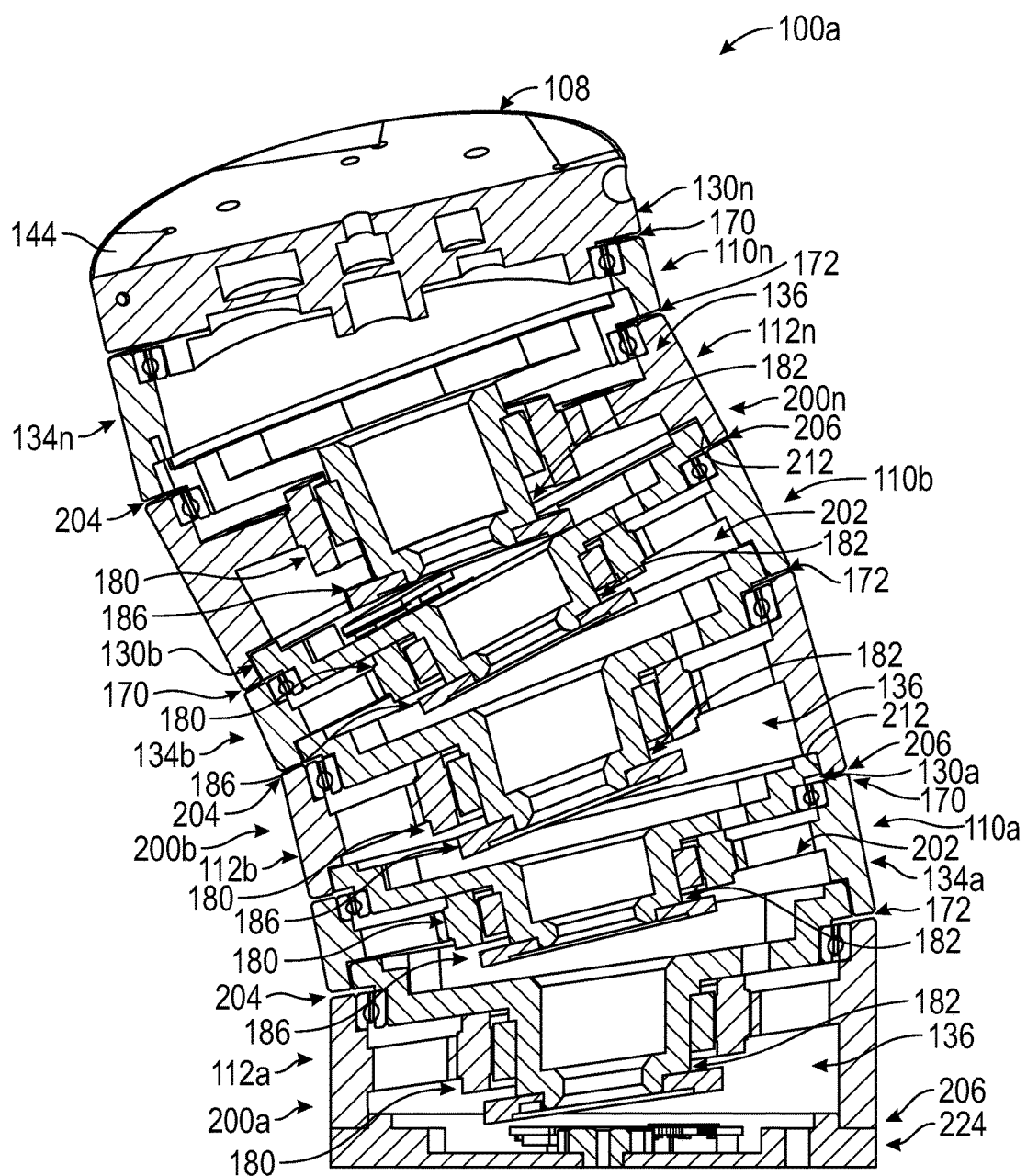
FIG. 13 is a cross-sectional view of the sensor platform of FIG. 12, taken along line 13-13 of FIG. 12, in accordance with various embodiments.

It should be noted that the various teachings of the present disclosure are not limited to sensor platform systems that include two articulation systems. Rather, with reference to FIG. 12, a sensor platform system 100a for use with the sensor system 12 of the vehicle 10 (FIG. 1B) is shown. As the sensor platform system 100a can be substantially similar to the sensor platform system 100, the same reference numerals will be used to denote the same or substantially similar components. In this example, the sensor platform system 100a includes the sensor mount 108 for coupling the sensing device 102 (FIG. 1A) to the sensor platform system 100a, a plurality of the first articulation systems 110a-110n, a plurality of the second articulation systems 112a-112n and the base plate 224. In this example, with reference to FIG. 13, the sensor platform system 100a does not include the body 220 or the flexible drive shaft 160 such that the sensor platform system 100a acts as an articulating arm. Stated another way, by removing the flexible drive shaft 160, the sensor platform system 100a is movable in yaw (e.g. rotation about the Z-axis), pitch (e.g., rotation about the Y-axis) and roll (e.g., rotation about the X-axis) to define a platform for the sensing device 102 with three degrees of rotational freedom.

The sensor platform system 100a is shown to include a plurality of the first articulation systems 110a-110n and a plurality of the second articulation systems 112a-112n. In this example, the plurality of the first articulation systems 110a-110n are coupled to the plurality of the second articulation systems 112a-112n in an alternating pattern from the base plate 224 (e.g. the second articulation system 112a, the first articulation system 110a, the second articulation system 112b, the first articulation system 110b and so on) to define three degrees of rotational freedom for positioning the sensor platform 100a. Generally, the sensor platform system 100a is coupled together such that the slanted second surface 172 of a respective first articulation cylinder 134 is coupled or adjacent to the slanted third surface 204 of a respective second articulation cylinder 200, and the first surface 170 of a respective first articulation cylinder 134 is adjacent to the fourth surface 206 of a respective second articulation cylinder 200. The coupling of the respective slanted second surface 172 and the respective slanted third surface 204 enables the relative movement between the respective one of the plurality of first articulation systems 110a-110n and the respective one of the plurality of second articulation systems 112a-112n. In this example, a respective one of the first articulation systems 110a-110n is received at least partially within a respective one of the second articulation systems 112a-112n. While the sensor platform system 100a is illustrated herein as including three of the first articulation systems 110 and three of the second articulation systems 112, it will be understood that the sensor platform system 100a can include any number of the first articulation system 110 and the second articulation system 112. In this example, the first articulation system 110n does not include the universal joint on the interface 130n as the sensor platform system 100a does not include the flexible drive shaft 160.

Moreover, while the interface 130n of the first articulation system 110n includes the first side 140 with the plurality of projections 144, the interfaces 130a, 130b associated with each of the first articulation systems 110a, 110b need not include the plurality of projections 144 about the first side 140 of the interface 130a, 130b. Rather, the first side 140 of the interface 130a, 130b of each of the first articulation systems 110a, 110b is substantially annular so as to be received within the fourth counterbore 212 of the respective one of the second articulation cylinder 200b, 200n.

As the sensor platform system 100a is movable by the control module 18 in the same or similar way as the sensor platform system 100, the movement of the sensor platform system 100a will not be discussed in great detail herein. Briefly, however, with the sensor platform system 100a assembled, the motor 180 associated with the first drive system 136 is responsive to one or more control signals received from the control module 18 to rotate the first articulation cylinder 134a about the longitudinal axis L. The motor 180 associated with the second drive system 202 is responsive to one or more control signals received from the control module 18 to rotate the second articulation cylinder 200b about the longitudinal axis L relative to the first articulation cylinder 134a and the first articulation cylinder 134b. The motor 180 associated with the first drive system 136 is responsive to one or more control signals received from the control module 18 to rotate the first articulation cylinder 134b about the longitudinal axis L relative to the second articulation cylinder 200b and the second articulation cylinder 200n. The motor 180 associated with the second drive system 202 is responsive to one or more control signals received from the control module 18 to rotate the second articulation cylinder 200n about the longitudinal axis L relative to the first articulation cylinder 134n and the first articulation cylinder 134b. The motor 180 associated with the first drive system 136 is responsive to one or more control signals received from the control module 18 to rotate the first articulation cylinder 134n about the longitudinal axis L relative to the second articulation cylinder 200n. The rotation of the first articulation cylinder 134n results in a direct rotation of the sensor mount 108 coupled to the first articulation system 110n. Thus, each of the first articulation systems 110a-110n and each of the second articulation systems 112a-112n are independently movable upon receipt of one or more control signals from the control module 18.

Generally, the sensor platform system 100a is in communication with the control module 18 over a suitable architecture that facilitates the transfer of commands, data, power, control signals, etc., such as a bus. Each of the motors 180 associated with the respective ones of the plurality of the first articulation systems 110a-110n and the plurality of second articulation systems 112b-112n are in communication with the control module 18, over a suitable architecture that facilitates the transfer of commands, data, power, control signals, etc., and are responsive to one or more control signals received from the control module 18 to rotate the respective motor 180 about the longitudinal axis L. Each of the position sensors 186 associated with the respective ones of the plurality of the first articulation systems 110a-110n and the plurality of second articulation systems 112b-112n are in communication with the control module 18 over a suitable architecture that facilitates the transfer of commands, data, power, control signals, etc., to communicate sensor signals generated based on the observed position of the respective spindle 182 to the control module 18.

The control system for the sensor platform system 100a, which may be embedded within the control module 18, is similar to the control system 300 for the sensor platform system 100. Generally, the control system for the sensor platform system 100a controls the motor 180 of the first drive system 136 of the plurality of the first articulation systems 110a-110n and controls the motor 180 of the second drive system 202 of the plurality of second articulation systems 112a-112n. In this example, the position determination module receives as input the desired position data, which includes a desired orientation of the sensor platform system 100a in, for example, spherical coordinates. Based on the received desired position data and the percent slant of the respective slanted second surfaces and the slanted third surfaces, the number of first articulation systems 110a-110n and the number of second articulation systems 112a-112n, the position determination module calculates angles $\theta_1$, $\theta_2 \ldots \theta_n$, to achieve the desired orientation for the sensor platform system 100a, while optimizing for a smallest amount of rotation. Based on the computed angle $\theta_1$, the movement control module outputs one or more control signals for the motor 180 of the second drive system 202 to move the spindle 182, and thus, the respective second articulation cylinder 200b to the orientation of angle $\theta_1$ Based on the computed angle $\theta_2$, the movement control module outputs one or more control signals for the motor 180 of the first drive system 136 to move the spindle 182, and thus, the respective first articulation cylinder 134a to the orientation of angle $\theta_2$. This process is repeated for each of the computed angles for each of the first drive systems 136 and the second drive systems 202 until the sensor platform system 100a is in the desired orientation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a movement of a platform for a sensor, comprising:
    receiving a desired position of the platform from a source, the desired position including a first coordinate value and a second coordinate value;
    based on the first coordinate value and the second coordinate value, calculating, by a processor, a first value associated with a first axis of rotation of the platform and calculating a second value associated with a second axis of rotation of the platform; and
    outputting, by the processor, one or more control signals to at least one motor associated with the platform to move the platform based on the first value and the second value,
    wherein the first value is calculated based on projection of a unit vector defined orthogonal to a top plane of the platform onto a Y-Z plane.

2. The method of claim 1, wherein the outputting further comprises:
    outputting, by the processor, one or more control signals to a first motor associated with the platform based on the first value; and
    outputting, by the processor, one or more control signals to a second motor associated with the platform based on the second value.

3. The method of claim 1, wherein the second value is calculated by the processor based on the first coordinate value and the first value, the first coordinate value is a first angular coordinate and the second coordinate value is a second angular coordinate.

4. The method of claim 1, wherein the first value is further calculated based on determining, by the processor, an angle the projection of the unit vector forms with a Z-axis.

5. The method of claim 1, wherein the first value is an angle of rotation for a portion of the platform about the first axis of rotation.

6. The method of claim 5, wherein the second value is an angle of rotation for a portion of the platform about the second axis of rotation, the second axis of rotation different than the first axis of rotation.

7. The method of claim 1, further comprising:
    receiving sensor signals from at least one position sensor associated with the at least one motor that indicates an absolute position of the at least one motor.

8. A system for controlling a movement of a platform for a sensor, comprising:
    a source of a desired position of the platform that includes a first angular coordinate value and a second angular coordinate value; and
    a control module having a processor that receives the desired position, and based on the desired position:
        calculates a first value associated with a first axis of rotation of the platform;
        calculates a second value associated with a second axis of rotation of the platform; and
        outputs one or more control signals to at least one motor associated with the platform to move the platform based on at least one of the first value and the second value,
        wherein the first value is calculated based on projection of a unit vector defined orthogonal to a top plane of the platform onto a Y-Z plane.

9. The system of claim 8, wherein the at least one motor comprises a first motor and a second motor, and the control module outputs the one or more control signals to the first motor based on the first value.

10. The system of claim 9, wherein the control module outputs one or more control signals to the second motor based on the second value.

11. The system of claim 10, wherein the control module outputs the one or more control signals to the first motor and the second motor substantially simultaneously.

12. The system of claim 9, wherein the second value is calculated by the processor based on the first coordinate value and the first value.

13. The system of claim 9, wherein the first value is an angle of rotation for a portion of the platform about the first axis of rotation.

14. The system of claim 13, wherein the second value is an angle of rotation for a portion of the platform about the second axis of rotation, the second axis of rotation different than the first axis of rotation.

15. A computer program product for processing a digital signal, comprising:
    a tangible storage medium readable by a processing circuit and storing instructions for execution by the processing circuit for performing a method for controlling a movement of a platform for a sensor comprising:
        calculating a first value associated with a first axis of rotation of the platform based on at least one of a first coordinate value and a second coordinate value for the movement of the platform;
        calculating a second value associated with a second axis of rotation of the platform based on at least one of the first coordinate value and the second coordinate value for the movement of the platform; and outputting one or more control signals to at least one motor associated with the platform based on the first value and the second value, wherein the first value is calculated based on projection of a unit vector defined orthogonal to a top plane of the platform onto a Y-Z plane.

16. The computer program product of claim 15, wherein the method further comprises:

receiving a desired position of the platform from a source, the desired position including the first coordinate value and the second coordinate value.

17. The computer program product of claim 15, wherein the outputting further comprises:

outputting one or more control signals to a first motor associated with the platform based on the first value; and outputting one or more control signals to a second motor associated with the platform based on the second value.

18. The computer program product of claim 15, wherein the second value is calculated based on the first coordinate value and the first value.

19. The computer program product of claim 15, wherein the first value is an angle of rotation for a portion of the platform about the first axis of rotation, and the second value is an angle of rotation for a portion of the platform about the second axis of rotation, the second axis of rotation different than the first axis of rotation.

* * * * *